United States Patent
Lev et al.

(10) Patent No.: US 10,061,867 B2
(45) Date of Patent: Aug. 28, 2018

(54) SYSTEM AND METHOD FOR INTERACTIVE MULTI-RESOLUTION TOPIC DETECTION AND TRACKING

(71) Applicant: GENESYS TELECOMMUNICATIONS LABORATORIES, INC., Daly City, CA (US)

(72) Inventors: Yoni Lev, Tel Aviv (IL); Avraham Faizakof, Kfar-Warburg (IL); Amir Lev-Tov, Bat-Yam (IL); Tamir Tapuhi, Ramat-Gan (IL); Yochai Konig, San Francisco, CA (US)

( * ) Notice: Subject to any disclaimer, the term of this patent is extended or adjusted under 35 U.S.C. 154(b) by 605 days.

(21) Appl. No.: 14/586,730

(22) Filed: Dec. 30, 2014

(65) Prior Publication Data
US 2016/0188672 A1  Jun. 30, 2016

(51) Int. Cl.
*G06F 17/30* (2006.01)
*G06Q 30/02* (2012.01)
*G06Q 50/00* (2012.01)

(52) U.S. Cl.
CPC .. *G06F 17/30976* (2013.01); *G06F 17/30713* (2013.01); *G06Q 30/0281* (2013.01); *G06Q 50/01* (2013.01)

(58) Field of Classification Search
CPC ......... G06F 17/30029; G06F 17/30699; G06F 17/30976
See application file for complete search history.

(56) References Cited

U.S. PATENT DOCUMENTS

| | | | | |
|---|---|---|---|---|
| 7,673,340 | B1 * | 3/2010 | Cohen | G06F 11/3438 379/266.08 |
| 8,402,041 | B2 * | 3/2013 | Chakra | G06Q 10/107 707/758 |
| 8,402,043 | B2 * | 3/2013 | Chakra | G06Q 10/107 707/758 |
| 9,288,000 | B2 * | 3/2016 | Kraenzel | H04H 60/48 |
| 9,407,589 | B2 * | 8/2016 | Speer | H04L 51/16 |
| 9,513,764 | B2 * | 12/2016 | Bhagwat | G06F 3/0481 |
| 9,612,624 | B2 * | 4/2017 | Yang | G06F 1/1669 |
| 9,754,051 | B2 * | 9/2017 | Bastide | G06F 17/3097 |
| 9,794,407 | B2 * | 10/2017 | Slovacek | H04M 3/5175 |
| 9,847,959 | B2 * | 12/2017 | Akavaram | H04L 51/16 |
| 9,852,459 | B1 * | 12/2017 | Deluca | G06Q 30/0613 |
| 9,875,308 | B2 * | 1/2018 | Kraenzel | G06F 17/30867 |
| 2006/0047656 | A1 * | 3/2006 | Dehlinger | G06F 17/30011 |

(Continued)

OTHER PUBLICATIONS

International Search Report and Written Opinion for Application PCT/US2015/067963, dated Apr. 19, 2016, 20 pages.

(Continued)

*Primary Examiner* — Debbie Le

(57) ABSTRACT

A method for tracking known topics in a plurality of interactions includes: extracting, by a processor, a plurality of fragments from the plurality of interactions; initializing, by the processor, a collection of tracked topics to an empty collection; computing, by the processor, a similarity between each fragment of the fragments and each of the known topics; and adding, by the processor, a known topic of the known topics to the tracked topics in response to the similarity between a fragment and the known topic exceeding a threshold value.

32 Claims, 15 Drawing Sheets

(56) References Cited

U.S. PATENT DOCUMENTS

| | | | |
|---|---|---|---|
| 2010/0205541 A1* | 8/2010 | Rapaport | G06Q 10/10 715/753 |
| 2012/0096029 A1 | 4/2012 | Tamura et al. | |
| 2012/0266250 A1* | 10/2012 | Uhl | G06F 21/6254 726/26 |
| 2013/0085745 A1 | 4/2013 | Koister et al. | |
| 2014/0108393 A1 | 4/2014 | Angwin | |
| 2014/0136544 A1 | 5/2014 | Spivack et al. | |
| 2014/0164385 A1* | 6/2014 | Liu | G06F 17/30702 707/740 |
| 2014/0207441 A1 | 7/2014 | Larcheveque et al. | |
| 2014/0324850 A1 | 10/2014 | Magnaghi et al. | |
| 2015/0046233 A1* | 2/2015 | Srulowitz | G06Q 10/06398 705/7.42 |
| 2015/0339327 A1* | 11/2015 | Unitt | G06F 17/30289 707/803 |
| 2016/0014064 A1* | 1/2016 | Harper | H04L 51/16 709/206 |

OTHER PUBLICATIONS

Allan, James, et al. "Taking topic detection from evaluation to practice." *System Sciences, 2005. HICSS '05. Proceedings of the 38th Annual Hawaii International Conference.* IEEE, 2005.

Allan, James, et al. "Topic detection and tracking pilot study final report." 1998.

Allan, James, et al. "First story detection in TDT is hard." *Proceedings of the ninth international conference on Information and knowledge management.* ACM, 2000.

Mohd, Masnizah, et al. "Design of an interface for interactive topic detection and tracking." *Flexible Query Answering Systems.* Springer Berlin Heidelberg, 2009. pp. 227-238.

Swan, Russell, et al. "Automatic generation of overview timelines." *Proceedings of the 23rd annual international ACM SIGIR conference on Research and development in information retrieval.* ACM, 2000.

Extended European Search Report for Application No. 15876215.3, dated Oct. 16, 2017, 11 pages.

* cited by examiner

SYSTEM AND METHOD FOR INTERACTIVE MULTI-RESOLUTION TOPIC DETECTION AND TRACKING

FIELD

Aspects of the present invention relate to performing analytics on communications. In particular, aspects of the present invention relate to analyzing recorded and live information to categorize conversations and to identify concepts, trends, and events.

BACKGROUND

An organization's contact center typically receives a multitude of communications or interactions regarding a variety of issues, e.g., telephone calls, chat sessions, email messages, and social media posts. Most of the issues will be common and reoccur on a regular basis, while others will be less common and will occur infrequently. For instance, a customer support department may interact with customers to discuss everyday problems with using the company's products (e.g., how to configure an internet connection), in addition to less common problems (e.g., how to connect VPN to the router).

SUMMARY

Aspects of embodiments of the present invention are directed to systems and methods for the detecting and tracking topics. Aspects of embodiments of the present invention are also directed to interactively exploring detected topics and controlling the detection and tracking of topics.

According to one embodiment, a method for tracking known topics in a plurality of interactions includes: extracting, by a processor, a plurality of fragments from the plurality of interactions; initializing, by the processor, a collection of tracked topics to an empty collection; computing, by the processor, a similarity between each fragment of the fragments and each of the known topics; and adding, by the processor, a known topic of the known topics to the tracked topics in response to the similarity between a fragment and the known topic exceeding a threshold value.

The known topics may correspond to a first time period, and the interactions may correspond to a second time period, the second time period being different from the first time period.

The method may further include: receiving a time point from a user interface, wherein the first time period is before the time point, and wherein the second time period is after the time point.

The plurality of interactions may to a first time period, and the method may further include: extracting, by a processor, a second plurality of fragments from a second plurality of interactions, the second plurality of interactions corresponding to a second time period, the second time period being different from the first time period; initializing, by the processor, a second collection of tracked topics to the empty collection; computing, by the processor, a similarity between each fragment of the second fragments and each of the known topics; and adding, by the processor, a known topic of the known topics to the second tracked topics in response to the similarity between a fragment and the known topic exceeding the threshold value.

The first time period may have a length different from a length of the second time period.

The first time period may have a start time different from a start time of the second time period.

Each of the known topics may include a template fragment, and the computing, by the processor, the similarity between the fragment of the fragments and a topic of the known topics may include computing a similarity between the fragment and the template fragment of the topic.

The method may further include: generating, by the processor, a visualization of the tracked topics.

The method may further include receiving, by the processor, a request to edit a topic of the tracked topics, the request including one or more of: a request to change a color of the topic in the visualization; a request to change a label of the topic; and a request to remove fragments from the topic.

The method may further include: receiving, by the processor, a user request to combine two topics of the tracked topics; and merging, by the processor, the two topics of the tracked topics.

According to one embodiment of the present invention, a method for detecting new topics in a plurality of interactions, given a plurality of known topics, includes: extracting, by a processor, a plurality of fragments from the plurality of interactions; initializing, by the processor, a collection of detected new fragments to an empty collection; computing, by the processor, a similarity between each fragment and each of the known topics; identifying, by the processor, for each fragment, a corresponding topic having a highest similarity; adding, by the processor, a fragment of the fragments to the collection of detected new fragments in response to the similarity between the fragment and the corresponding topic having the highest similarity is less than a threshold value; and extracting, by the processor, one or more new topics from the collection of detected new fragments.

The method may further include: receiving, by the processor, a request to stop tracking a blacklisted topic; adding, by the processor, the blacklisted topic to a collection of blacklisted topics; and computing, by the processor, a similarity between each fragment and each of the blacklisted topics, wherein the computing, by the processor, the similarity between each fragment and each of the known topics is only performed in response to the similarity of the fragment to any blacklisted topic being less than a blacklist threshold value.

The method may further include: receiving, by the processor, a request to start tracking a user topic; adding, by the processor, the user topic to a collection of user topics; determining, by the processor, whether one or more of the user topics are user suggested topics; generating, by the processor, a topic for each of the user suggested topics; and adding the collection of user topics to the plurality of known topics.

The method may further include: receiving, by the processor, a plurality of blacklisted topics; and removing, by the processor, all of the blacklisted topics from the one or more new topics.

According to one embodiment of the present invention, a method for detecting one or more events in a portion of an interaction, given a plurality of known topics, includes: extracting, by a processor, a plurality of fragments from the portion of the interaction; initializing, by the processor, a collection of detected new fragments to an empty collection; computing, by the processor, a similarity between each fragment and each of the known topics; identifying, by the processor, for each fragment, a corresponding topic having a highest similarity; adding, by the processor, a fragment of the fragments to the collection of detected new fragments in response to the similarity between the fragment and the corresponding topic having the highest similarity being than a threshold value; extracting, by the processor, one or more noun phrases from the collection of detected new fragments; and filtering, by the processor, one or more events from the one or more noun phrases.

The method may further include: receiving, by the processor, a plurality of blacklisted topics; and removing, by the processor, all of the blacklisted topics from the one or more events.

According to one embodiment of the present invention, a method for automatically generating a new topic based on a search query, includes: receiving, by a processor, the search query; determining, by the processor, a plurality of fragments corresponding to the search query; identifying, by the processor, a template fragment of the plurality of fragments, each of the fragments having a similarity to the template fragment exceeding a threshold; and generating, by the processor, the new topic in accordance with the template fragment and the fragments.

According to one embodiment of the present invention, a system for tracking known topics in a plurality of interactions, includes: a processor; and memory, wherein the memory has stored thereon instructions that, when executed by the processor, cause the processor to: extract a plurality of fragments from the plurality of interactions; initialize a collection of tracked topics to an empty collection; compute a similarity between each fragment of the fragments and each of the known topics; and add a known topic of the known topics to the tracked topics in response to the similarity between a fragment and the known topic exceeding a threshold value.

The known topics may correspond to a first time period, and the interactions may correspond to a second time period, the second time period being different from the first time period.

The memory may further store instructions that, when executed by the processor, cause the processor to: receive a time point from a user interface, wherein the first time period is before the time point, and wherein the second time period is after the time point.

The plurality of interactions may correspond to a first time period, and the memory may further store instructions that, when executed by the processor, cause the processor to: extract a second plurality of fragments from a second plurality of interactions, the second plurality of interactions corresponding to a second time period, the second time period being different from the first time period; initialize a second collection of tracked topics to the empty collection; compute a similarity between each fragment of the second fragments and each of the known topics; and add a known topic of the known topics to the second tracked topics in response to the similarity between a fragment and the known topic exceeding the threshold value.

The first time period may have a length different from a length of the second time period.

The first time period may have a start time different from a start time of the second time period.

Each of the known topics may include a template fragment, and the instructions to compute the similarity between the fragment of the fragments and a topic of the known topics comprise instructions to compute a similarity between the fragment and the template fragment of the topic.

The memory may further store instructions that, when executed by the processor, cause the processor to: generate, by the processor, a visualization of the tracked topics.

The memory may further store instructions that, when executed by the processor, cause the processor to: receive a request to edit a topic of the tracked topics, the request including one or more of: a request to change a color of the topic in the visualization; a request to change a label of the topic; and a request to remove fragments from the topic.

The memory may further store instructions that, when executed by the processor, cause the processor to: receive a user request to combine two topics of the tracked topics; and merge the two topics of the tracked topics.

According to one embodiment of the present invention, a system for detecting new topics in a plurality of interactions, given a plurality of known topics includes: a processor; and memory, wherein the memory has stored thereon instructions that, when executed by the processor, cause the processor to: extract a plurality of fragments from the plurality of interactions; initialize a collection of detected new fragments to an empty collection; compute a similarity between each fragment and each of the known topics; identify, for each fragment, a corresponding topic having a highest similarity; add a fragment of the fragments to the collection of detected new fragments in response to the similarity between the fragment and the corresponding topic having the highest similarity is less than a threshold value; and extract one or more new topics from the collection of detected new fragments.

The memory may further store instructions that, when executed by the processor, cause the processor to: receive a request to stop tracking a blacklisted topic; add the blacklisted topic to a collection of blacklisted topics; and compute a similarity between each fragment and each of the blacklisted topics, wherein the instructions to compute the similarity between each fragment and each of the known topics are only executed in response to the similarity of the fragment to any blacklisted topic being less than a blacklist threshold value.

The memory may further store thereon instructions that, when executed by the processor, cause the processor to: receive a request to start tracking a user topic; add the user topic to a collection of user topics; determine whether one or more of the user topics are user suggested topics; generate a topic for each of the user suggested topics; and add the collection of user topics to the plurality of known topics.

The memory may further store instructions that, when executed by the processor, cause the processor to: receive a plurality of blacklisted topics; and remove all of the blacklisted topics from the one or more new topics.

According to one embodiment of the present invention, a system for detecting one or more events in a portion of an interaction, given a plurality of known topics includes: a processor; and memory, wherein the memory has stored thereon instructions that, when executed by the processor, cause the processor to: extract a plurality of fragments from the portion of the interaction; initialize a collection of detected new fragments to an empty collection; compute a similarity between each fragment and each of the known topics; identify, for each fragment, a corresponding topic having a highest similarity; add a fragment of the fragments to the collection of detected new fragments in response to the similarity between the fragment and the corresponding topic having the highest similarity being than a threshold value; extract one or more noun phrases from the collection of detected new fragments; and filter one or more events from the one or more noun phrases.

The memory may further have stored thereon instructions that, when executed by the processor, cause the processor to:

receive a plurality of blacklisted topics; and remove all of the blacklisted topics from the one or more events.

According to one embodiment of the present invention, a system for automatically generating a new topic based on a search query includes: a processor; and memory, wherein the memory has stored thereon instructions that, when executed by the processor, cause the processor to: receive the search query; determine a plurality of fragments corresponding to the search query; identify a template fragment of the plurality of fragments, each of the fragments having a similarity to the template fragment exceeding a threshold; and generate the new topic in accordance with the template fragment and the fragments.

BRIEF DESCRIPTION OF THE DRAWINGS

The accompanying drawings, together with the specification, illustrate exemplary embodiments of the present invention, and, together with the description, serve to explain the principles of the present invention.

DETAILED DESCRIPTION

Figure 1:
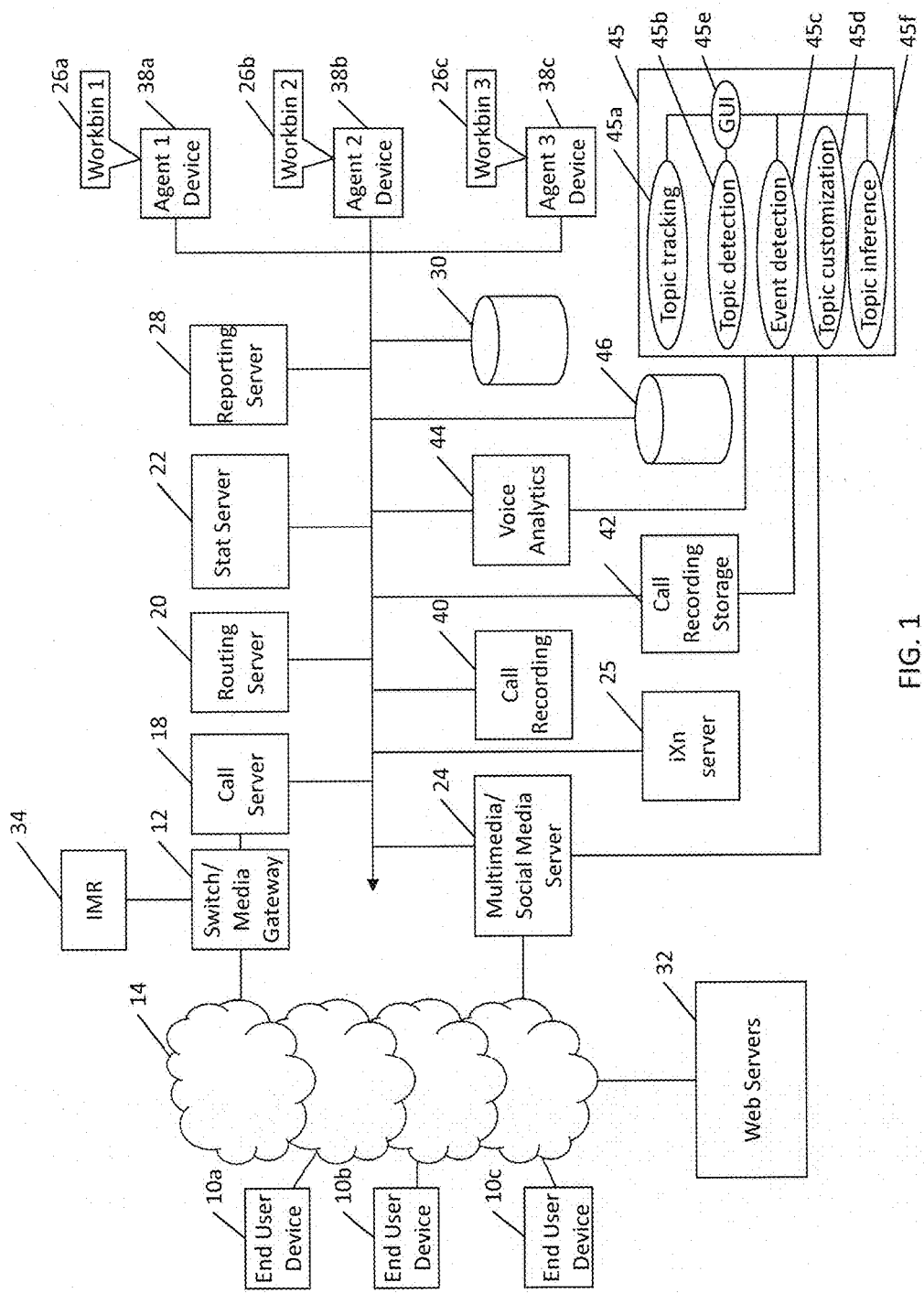
FIG. 1 is a schematic block diagram of a system supporting a contact center that is configured to provide access to searchable transcripts to customer service agents according to one exemplary embodiment of the invention.

In the following detailed description, only certain exemplary embodiments of the present invention are shown and described, by way of illustration. As those skilled in the art would recognize, the invention may be embodied in many different forms and should not be construed as being limited to the embodiments set forth herein. Like reference numerals designate like elements throughout the specification.

As described herein, various applications and aspects of the present invention may be implemented in software, firmware, hardware, and combinations thereof. When implemented in software, the software may operate on a general purpose computing device such as a server, a desktop computer, a tablet computer, a smartphone, or a personal digital assistant. Such a general purpose computer includes a general purpose processor and memory.

Some embodiments of the present invention will be described in the context of a contact center. However, embodiments of the present invention are not limited thereto and may also be used in under other conditions involving searching recorded audio such as in computer based education systems, voice messaging systems, medical transcripts, or any speech corpora from any source.

Aspects of embodiments of the present invention are broadly directed to systems and methods for tracking topics and issues over time, detecting new events, and providing for user interaction with modifying and adjusting the process of tracking topics and issues and detecting new events.

Aspects of embodiments of the present invention allow an organization to organize its data according to those tracked issues and to identify changes and trends in the patterns with which these issues appear. For example, when a new model of a mobile device is released, calls regarding the previous model of the mobile device will decrease in frequency while calls regarding the new model will increase in frequency as users switch from the old model to the new model. Detecting and tracking these trends allow organizations to respond to these trends by, for example, providing additional training for agents in skills to address new issues; scheduling agents based on predicted demand for particular skills; and providing self-help options to users.

Some aspects of embodiments of the present invention relate to detecting new events. For example, customers may call to complain that their new cell phones are permanently bending in their pockets. Detecting these events can alert organizations to issues so that they can take appropriate actions in response. The event can become a new, ongoing topic or may be an event that disappears after the underlying issue is resolved (e.g., the event may disappear after a change in the design of the cell phone that removes the bending problem).

Aspects of embodiments of the present invention relating to user interactivity relate to providing a user with the ability to modify the topic and event detection system in accordance with the user's business intelligence and needs. For example, the user may "blacklist" or "hide" particular automatically detected topics that are not of interest (e.g., topics that are not useful from a business standpoint). As another example, the user may highlight or flag particular topics as being important or group together topics that are of particular interest.

In one embodiment, the above-described systems and methods are used in the context of a contact center and are used to monitor and infer topics of conversation during interactions between customers and an organization.

FIG. 1 is a schematic block diagram of a system for supporting a contact center in providing contact center services according to one exemplary embodiment of the invention. The contact center may be an in-house facility to a business or corporation for serving the enterprise in performing the functions of sales and service relative to the products and services available through the enterprise. In another aspect, the contact center may be a third-party service provider. The contact center may be deployed in equipment dedicated to the enterprise or third-party service provider, and/or deployed in a remote computing environment such as, for example, a private or public cloud environment with infrastructure for supporting multiple contact centers for multiple enterprises. The various components of the contact center may also be distributed across various geographic locations and computing environments and not necessarily contained in a single location, computing environment, or even computing device.

According to one exemplary embodiment, the contact center includes resources (e.g. personnel, computers, and telecommunication equipment) to enable delivery of services via telephone or other communication mechanisms. Such services may vary depending on the type of contact center, and may range from customer service to help desk, emergency response, telemarketing, order taking, and the like.

Customers, potential customers, or other end users (collectively referred to as customers) desiring to receive services from the contact center may initiate inbound calls to the contact center via their end user devices 10a-10c (collectively referenced as 10). Each of the end user devices 10 may be a communication device conventional in the art, such as, for example, a telephone, wireless phone, smart phone, personal computer, electronic tablet, and/or the like. Users operating the end user devices 10 may initiate, manage, and respond to telephone calls, emails, chats, text messaging, web-browsing sessions, and other multi-media transactions.

Inbound and outbound calls from and to the end users devices 10 may traverse a telephone, cellular, and/or data communication network 14 depending on the type of device that is being used. For example, the communications network 14 may include a private or public switched telephone network (PSTN), local area network (LAN), private wide area network (WAN), and/or public wide area network such as, for example, the Internet. The communications network 14 may also include a wireless carrier network including a code division multiple access (CDMA) network, global system for mobile communications (GSM) network, or any wireless network/technology conventional in the art, including but to limited to 3G, 4G, LTE, and the like.

According to one exemplary embodiment, the contact center includes a switch/media gateway 12 coupled to the communications network 14 for receiving and transmitting calls between end users and the contact center. The switch/media gateway 12 may include a telephony switch configured to function as a central switch for agent level routing within the center. The switch may be a hardware switching system or a soft switch implemented via software. For example, the switch 12 may include an automatic call distributor, a private branch exchange (PBX), an IP-based software switch, and/or any other switch configured to receive Internet-sourced calls and/or telephone network-sourced calls from a customer, and route those calls to, for example, an agent telephony device. In this example, the switch/media gateway establishes a voice path (not shown) between the calling customer and the agent telephony device, by establishing, for example, a connection between the customer's telephone line and the agent's telephone line.

According to one exemplary embodiment of the invention, the switch is coupled to a call server 18 which may, for example, serve as an adapter or interface between the switch and the remainder of the routing, monitoring, and other call-handling components of the contact center.

The call server 102 may be configured to process PSTN calls, VoIP calls, and the like. For example, the call server 102 may include a session initiation protocol (SIP) server for processing SIP calls. According to some exemplary embodiments, the call server 102 may, for example, extract data about the customer interaction such as the caller's telephone number, often known as the automatic number identification (ANI) number, or the customer's internet protocol (IP) address, or email address, and communicate with other CC components and/or CC iXn controller 18 in processing the call.

According to one exemplary embodiment of the invention, the system further includes an interactive media response (IMR) server 34, which may also be referred to as a self-help system, virtual assistant, or the like. The IMR server 34 may be similar to an interactive voice response (IVR) server, except that the IMR server is not restricted to voice, but may cover a variety of media channels including voice. Taking voice as an example, however, the IMR server may be configured with an IMR script for querying calling customers on their needs. For example, a contact center for a bank may tell callers, via the IMR script, to "press 1" if they wish to get an account balance. If this is the case, through continued interaction with the IMR, customers may complete service without needing to speak with an agent. The IMR server 34 may also ask an open ended question such as, for example, "How can I help you?" and the customer may speak or otherwise enter a reason for contacting the contact center. The customer's response may then be used by the routing server 20 to route the call to an appropriate contact center resource.

If the call is to be routed to an agent, the call server 18 interacts with a routing server 20 to find an appropriate agent for processing the call. The selection of an appropriate agent for routing an inbound call may be based, for example, on a routing strategy employed by the routing server 20, and further based on information about agent availability, skills, and other routing parameters provided, for example, by a statistics server 22.

In some embodiments, the routing server 20 may query a customer database, which stores information about existing clients, such as contact information, service level agreement (SLA) requirements, nature of previous customer contacts and actions taken by contact center to resolve any customer issues, and the like. The database may be managed by any database management system conventional in the art, such as Oracle, IBM DB2, Microsoft SQL server, Microsoft Access, PostgreSQL, MySQL, FoxPro, and SQLite, and may be stored in a mass storage device 30. The routing server 20 may query the customer information from the customer database via an ANI or any other information collected by the IMR server 34.

Once an appropriate agent is available to handle a call, a connection is made between the caller and the agent device 38a-38c (collectively referenced as 38) of the identified agent. Collected information about the caller (e.g. via interaction with the IMR server 34) and/or the caller's historical information may also be provided to the agent device for aiding the agent in better servicing the call. In this regard, each agent device 38 may include a telephone adapted for regular telephone calls, VoIP calls, and the like. The agent device 38 may also include a computer for communicating with one or more servers of the contact center and performing data processing associated with contact center operations, and for interfacing with customers via voice and other multimedia communication mechanisms.

The contact center may also include a multimedia/social media server for engaging in media interactions other than voice interactions with the end user devices 10 and/or web servers 32. The media interactions may be related, for example, to email, vmail (voice mail through email), chat, video, text-messaging, web, social media, co-browsing, and the like. The web servers 32 may include, for example, social interaction site hosts for a variety of known social interaction sites to which an end user may subscribe, such as, for example, Facebook, Twitter, and the like. The web servers may also provide web pages for the enterprise that is being supported by the contact center. End users may browse the web pages and get information about the enterprise's products and services. The web pages may also provide a mechanism for contacting the contact center, via, for example, web chat, voice call, email, web real time communication (WebRTC), or the like.

According to one exemplary embodiment of the invention, in addition to real-time interactions, deferrable (also referred to as back-office or offline) interactions/activities may also be routed to the contact center agents. Such deferrable activities may include, for example, responding to emails, responding to letters, attending training seminars, or any other activity that does not entail real time communication with a customer. In this regard, an iXn server 25 interacts with the routing server 20 for selecting an appropriate agent to handle the activity. Once assigned to an agent, the activity may be pushed to the agent, or may appear in the agent's workbin 26a-26c (collectively referenced as 26) as a task to be completed by the agent. The agent's workbin may be implemented via any data structure conventional in the art, such as, for example, a linked list, array, and/or the like. The workbin may be maintained, for example, in buffer memory of each agent device 38.

According to one exemplary embodiment of the invention, the mass storage device(s) 30 may store one or more databases relating to agent data (e.g. agent profiles, schedules, etc.), customer data (e.g. customer profiles), interaction data (e.g. details of each interaction with a customer, including reason for the interaction, disposition data, time on hold, handle time, etc.), and the like. According to one embodiment, some of the data (e.g. customer profile data) may be maintained in a customer relations management (CRM) database hosted in the mass storage device 30 or elsewhere. The mass storage device may take form of a hard disk or disk array as is conventional in the art.

The contact center may also include a reporting server 28 configured to generate reports from data aggregated by the statistics server 22. Such reports may include near real-time reports or historical reports concerning the state of resources, such as, for example, average waiting time, abandonment rate, agent occupancy, and the like. The reports may be generated automatically or in response to specific requests from a requestor (e.g. agent/administrator, contact center application, and/or the like).

According to one embodiment of the present invention, the contact center 102 also includes a call recording server 40 for recording the audio of calls conducted through the contact center 102, a call recording storage server 42 for storing the recorded audio, a speech analytics server 44 configured to process and analyze audio collected in the from the contact center 102, and a speech index database 46 for providing an index of the analyzed audio.

The speech analytics server 44 may be coupled to (or may include) an analytics server 45 including a topic tracking module 45a, a topic detection module 45b, an event detection module 45c, a topic customization module 45d, a user interface module 45e, and a topic inference module 45f. The analytics server 45 may be configured to provide the automatic detection of topics from interactions recorded by the call recording server 40 and stored on the call recording storage server 42. The analytics server 45 may also access data stored on, for example, the multimedia/social media server 24 in order to process interactions from various chat, social media, email, and other non-voice interactions.

The various servers of FIG. 1 may each include one or more processors executing computer program instructions and interacting with other system components for performing the various functionalities described herein. The computer program instructions are stored in a memory implemented using a standard memory device, such as, for example, a random access memory (RAM). The computer program instructions may also be stored in other non-transitory computer readable media such as, for example, a CD-ROM, flash drive, or the like. Also, although the functionality of each of the servers is described as being provided by the particular server, a person of skill in the art should recognize that the functionality of various servers may be combined or integrated into a single server, or the functionality of a particular server may be distributed across one or more other servers without departing from the scope of the embodiments of the present invention.

In the various embodiments, the term interaction is used generally to refer to any real-time and non-real time interaction that uses any communication channel including, without limitation telephony calls (PSTN or VoIP calls), emails, vmails (voice mail through email), video, chat, screen-sharing, text messages, social media messages, web real-time communication (e.g. WebRTC calls), and the like.

Each of the various servers in the contact center may be a process or thread, running on one or more processors, in one or more computing devices 500 (e.g., FIG. 2A, FIG. 2B), executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that a computing device may be implemented via firmware (e.g. an application-specific integrated circuit), hardware, or a combination of software, firmware, and hardware. A person of skill in the art should also recognize that the functionality of various computing devices may be combined or integrated into a single computing device, or the functionality of a particular computing device may be distributed across one or more other computing devices without departing from the scope of the exemplary embodiments of the present invention. A server may be a software module, which may also simply be referred to as a module. The set of modules in the contact center may include servers and other modules.

Figure 2A:
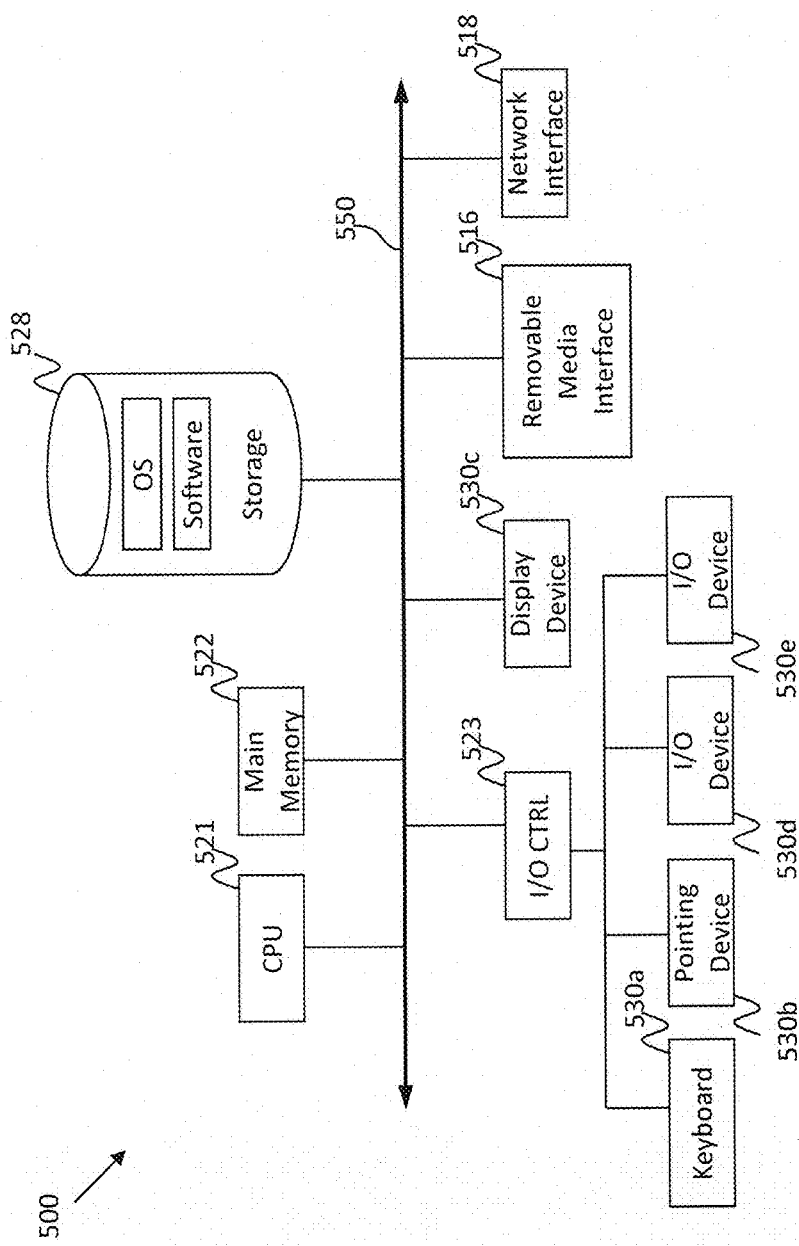
FIG. 2A is a block diagram of a computing device according to an embodiment of the present invention.
Figure 2B:
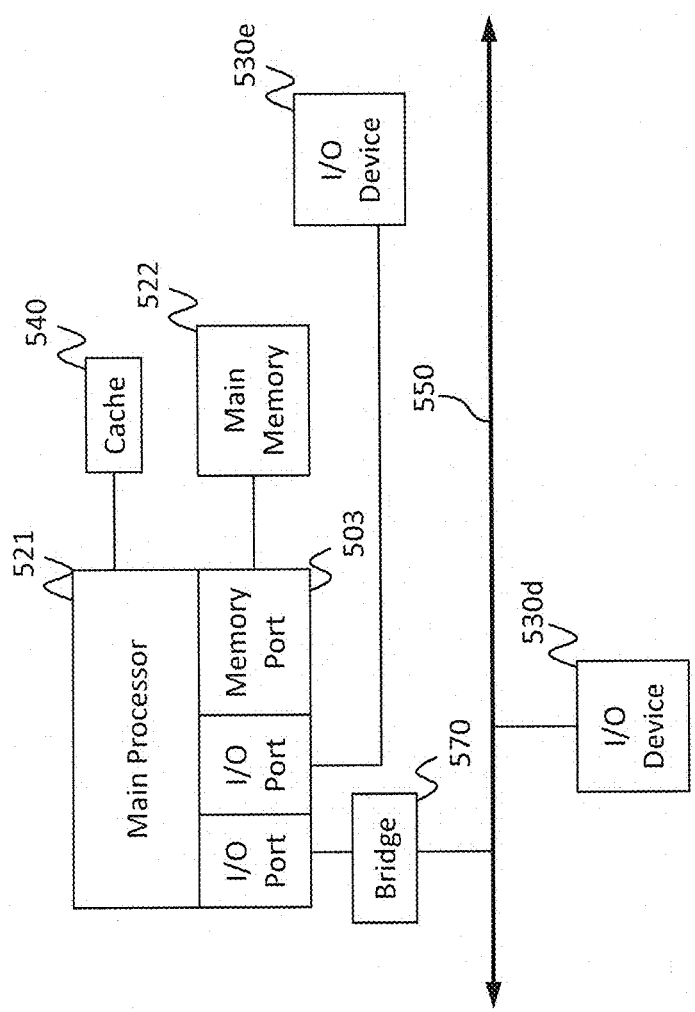
FIG. 2B is a block diagram of a computing device according to an embodiment of the present invention.

FIG. 2A and FIG. 2B depict block diagrams of a computing device 500 as may be employed in exemplary embodiments of the present invention. As shown in FIG. 2A and FIG. 2B, each computing device 500 includes a central processing unit 521, and a main memory unit 522. As shown in FIG. 2A, a computing device 500 may include a storage device 528, a removable media interface 516, a network interface 518, an input/output (I/O) controller 523, one or more display devices 530*c*, a keyboard 530*a* and a pointing device 530*b*, such as a mouse. The storage device 528 may include, without limitation, storage for an operating system and software. As shown in FIG. 2B, each computing device 500 may also include additional optional elements, such as a memory port 503, a bridge 570, one or more additional input/output devices 530*d*, 530*e* and a cache memory 540 in communication with the central processing unit 521. Input/output devices, e.g., 530*a*, 530*b*, 530*d*, and 530*e*, may be referred to herein using reference numeral 530.

The central processing unit 521 is any logic circuitry that responds to and processes instructions fetched from the main memory unit 522. It may be implemented, for example, in an integrated circuit, in the form of a microprocessor, microcontroller, or graphics processing unit (GPU), or in a field-programmable gate array (FPGA) or application-specific integrated circuit (ASIC). Main memory unit 522 may be one or more memory chips capable of storing data and allowing any storage location to be directly accessed by the central processing unit 521. In the embodiment shown in FIG. 2A, the central processing unit 521 communicates with main memory 522 via a system bus 550. FIG. 2B depicts an embodiment of a computing device 500 in which the central processing unit 521 communicates directly with main memory 522 via a memory port 503.

FIG. 2B depicts an embodiment in which the central processing unit 521 communicates directly with cache memory 540 via a secondary bus, sometimes referred to as a backside bus. In other embodiments, the central processing unit 521 communicates with cache memory 540 using the system bus 550. Cache memory 540 typically has a faster response time than main memory 522. In the embodiment shown in FIG. 2A, the central processing unit 521 communicates with various I/O devices 530 via a local system bus 550. Various buses may be used as a local system bus 550, including a Video Electronics Standards Association (VESA) Local bus (VLB), an Industry Standard Architecture (ISA) bus, an Extended Industry Standard Architecture (EISA) bus, a MicroChannel Architecture (MCA) bus, a Peripheral Component Interconnect (PCI) bus, a PCI Extended (PCI-X) bus, a PCI-Express bus, or a NuBus. For embodiments in which an I/O device is a display device 530*c*, the central processing unit 521 may communicate with the display device 530*c* through an Advanced Graphics Port (AGP). FIG. 2B depicts an embodiment of a computer 500 in which the central processing unit 521 communicates directly with I/O device 530*e*. FIG. 2B also depicts an embodiment in which local busses and direct communication are mixed: the central processing unit 521 communicates with I/O device 530*d* using a local system bus 550 while communicating with I/O device 530*e* directly.

A wide variety of I/O devices 530 may be present in the computing device 500. Input devices include one or more keyboards 530*a*, mice, trackpads, trackballs, microphones, and drawing tablets. Output devices include video display devices 530*c*, speakers, and printers. An I/O controller 523, as shown in FIG. 2A, may control the I/O devices. The I/O controller may control one or more I/O devices such as a keyboard 530*a* and a pointing device 530*b*, e.g., a mouse or optical pen.

Referring again to FIG. 2A, the computing device 500 may support one or more removable media interfaces 516, such as a floppy disk drive, a CD-ROM drive, a DVD-ROM drive, tape drives of various formats, a USB port, a Secure Digital or COMPACT FLASH™ memory card port, or any other device suitable for reading data from read-only media, or for reading data from, or writing data to, read-write media. An I/O device 530 may be a bridge between the system bus 550 and a removable media interface 516.

The removable media interface 516 may for example be used for installing software and programs. The computing device 500 may further include a storage device 528, such as one or more hard disk drives or hard disk drive arrays, for storing an operating system and other related software, and for storing application software programs. Optionally, a removable media interface 516 may also be used as the storage device. For example, the operating system and the software may be run from a bootable medium, for example, a bootable CD.

In some embodiments, the computing device 500 may include or be connected to multiple display devices 530*c*, which each may be of the same or different type and/or form. As such, any of the I/O devices 530 and/or the I/O controller 523 may include any type and/or form of suitable hardware, software, or combination of hardware and software to support, enable or provide for the connection to, and use of, multiple display devices 530*c* by the computing device 500. For example, the computing device 500 may include any type and/or form of video adapter, video card, driver, and/or library to interface, communicate, connect or otherwise use the display devices 530*c*. In one embodiment, a video adapter may include multiple connectors to interface to multiple display devices 530*c*. In other embodiments, the computing device 500 may include multiple video adapters, with each video adapter connected to one or more of the display devices 530*c*. In some embodiments, any portion of the operating system of the computing device 500 may be configured for using multiple display devices 530*c*. In other embodiments, one or more of the display devices 530*c* may be provided by one or more other computing devices, connected, for example, to the computing device 500 via a network. These embodiments may include any type of software designed and constructed to use the display device of another computing device as a second display device 530*c* for the computing device 500. One of ordinary skill in the art will recognize and appreciate the various ways and embodiments that a computing device 500 may be configured to have multiple display devices 530*c*.

A computing device 500 of the sort depicted in FIG. 2A and FIG. 2B may operate under the control of an operating system, which controls scheduling of tasks and access to system resources. The computing device 500 may be running any operating system, any embedded operating system, any real-time operating system, any open source operating system, any proprietary operating system, any operating systems for mobile computing devices, or any other operating system capable of running on the computing device and performing the operations described herein.

The computing device 500 may be any workstation, desktop computer, laptop or notebook computer, server machine, handheld computer, mobile telephone or other portable telecommunication device, media playing device, gaming system, mobile computing device, or any other type and/or form of computing, telecommunications or media device that is capable of communication and that has sufficient processor power and memory capacity to perform the operations described herein. In some embodiments, the computing device 500 may be a virtualized computing device and the virtualized computing device may be running in a networked or cloud based environment. In some embodiments, the computing device 500 may have different processors, operating systems, and input devices consistent with the device.

In other embodiments the computing device 500 is a mobile device, such as a Java-enabled cellular telephone or personal digital assistant (PDA), a smart phone, a digital audio player, or a portable media player. In some embodiments, the computing device 500 includes a combination of devices, such as a mobile phone combined with a digital audio player or portable media player.

Figure 2D:
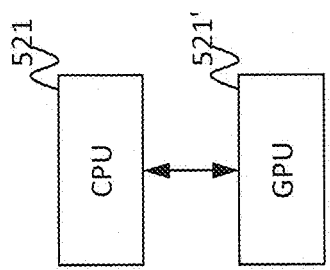
FIG. 2D is a block diagram of a computing device according to an embodiment of the present invention.
Figure 2C:
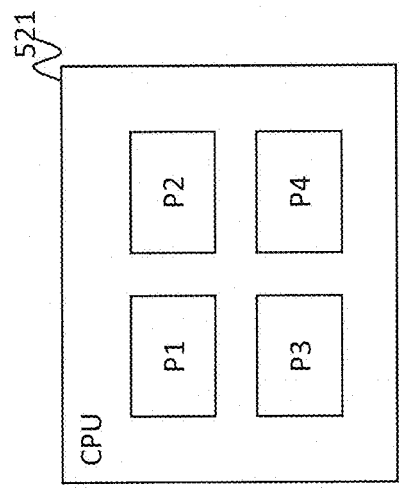
FIG. 2C is a block diagram of a computing device according to an embodiment of the present invention.

As shown in FIG. 2C, the central processing unit 521 may include multiple processors P1, P2, P3, P4, and may provide functionality for simultaneous execution of instructions or for simultaneous execution of one instruction on more than one piece of data. In some embodiments, the computing device 500 may include a parallel processor with one or more cores. In one of these embodiments, the computing device 500 is a shared memory parallel device, with multiple processors and/or multiple processor cores, accessing all available memory as a single global address space. In another of these embodiments, the computing device 500 is a distributed memory parallel device with multiple processors each accessing local memory only. In still another of these embodiments, the computing device 500 has both some memory which is shared and some memory which may only be accessed by particular processors or subsets of processors. In still even another of these embodiments, the central processing unit 521 includes a multicore microprocessor, which combines two or more independent processors into a single package, e.g., into a single integrated circuit (IC). In one exemplary embodiment, depicted in FIG. 2D, the computing device 500 includes at least one central processing unit 521 and at least one graphics processing unit 521'.

In some embodiments, a central processing unit 521 provides single instruction, multiple data (SIMD) functionality, e.g., execution of a single instruction simultaneously on multiple pieces of data. In other embodiments, several processors in the central processing unit 521 may provide functionality for execution of multiple instructions simultaneously on multiple pieces of data (MIMD). In still other embodiments, the central processing unit 521 may use any combination of SIMD and MIMD cores in a single device.

Figure 2E:
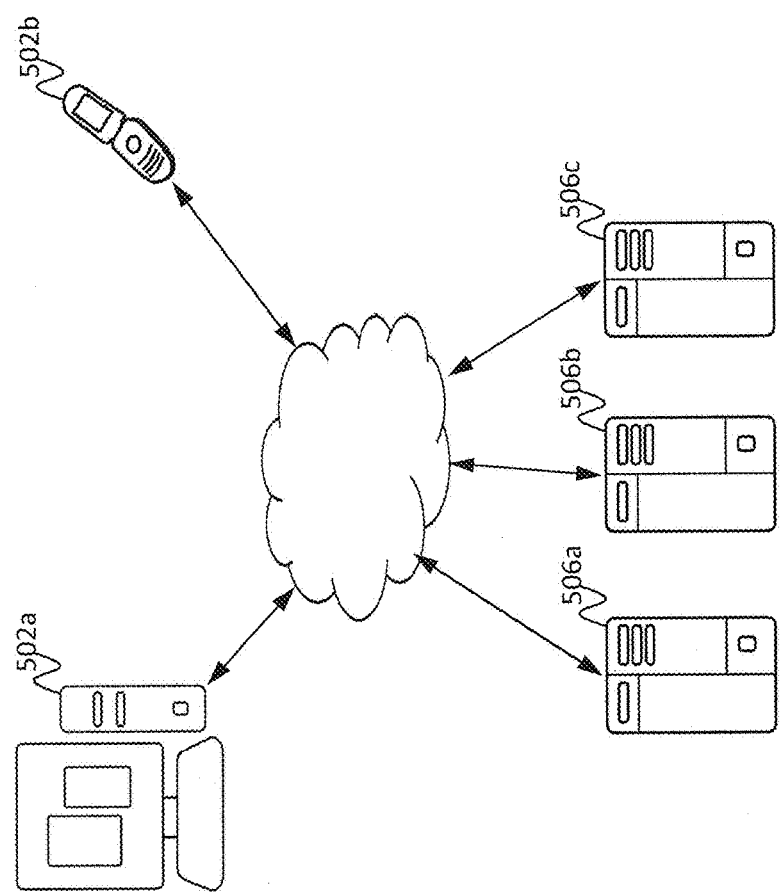
FIG. 2E is a block diagram of a network environment including several computing devices according to an embodiment of the present invention.

A computing device may be one of a plurality of machines connected by a network, or it may include a plurality of machines so connected. FIG. 2E shows an exemplary network environment. The network environment includes one or more local machines 502a, 502b (also generally referred to as local machine(s) 502, client(s) 502, client node(s) 502, client machine(s) 502, client computer(s) 502, client device(s) 502, endpoint(s) 502, or endpoint node(s) 502) in communication with one or more remote machines 506a, 506b, 506c (also generally referred to as server machine(s) 506 or remote machine(s) 506) via one or more networks 504. In some embodiments, a local machine 502 has the capacity to function as both a client node seeking access to resources provided by a server machine and as a server machine providing access to hosted resources for other clients 502a, 502b. Although only two clients 502 and three server machines 506 are illustrated in FIG. 2E, there may, in general, be an arbitrary number of each. The network 504 may be a local-area network (LAN), e.g., a private network such as a company Intranet, a metropolitan area network (MAN), or a wide area network (WAN), such as the Internet, or another public network, or a combination thereof.

The computing device 500 may include a network interface 518 to interface to the network 504 through a variety of connections including, but not limited to, standard telephone lines, local-area network (LAN), or wide area network (WAN) links, broadband connections, wireless connections, or a combination of any or all of the above. Connections may be established using a variety of communication protocols. In one embodiment, the computing device 500 communicates with other computing devices 500 via any type and/or form of gateway or tunneling protocol such as Secure Socket Layer (SSL) or Transport Layer Security (TLS). The network interface 518 may include a built-in network adapter, such as a network interface card, suitable for interfacing the computing device 500 to any type of network capable of communication and performing the operations described herein. An I/O device 530 may be a bridge between the system bus 550 and an external communication bus.

Generally, topic detection and tracking (TDT) may be used to detect and track new events in a stream of natural language data such as news reports and customer interactions. These separate items may be referred to generically as "documents," and are not limited to text files but may include, for example, audio conversations processed by an automatic speech recognition (ASR) engine and various types of recorded interactions such as transcripts of text chat sessions, transcripts of telephone or voice over IP calls, etc.

One approach to detecting and tracking the progress of existing topics and detecting new topics is to compare a particular data sample (e.g., a particular conversation) with previously detected topics (or "known topics") and to generate a similarity measure as a result of the comparison. If the data sample is sufficiently similar to an old topic, then the sample is added to the topic. If the data sample is not sufficiently similar to any of the old topics, then a new topic can be created with that data sample.

Embodiments of the present invention are also directed to systems and methods for detecting and tracking new events and topics within single words or phrases and mapping those single words or phrases onto full topics or categories that represent a group of sentences and phrases. Embodiments of the present invention are also directed to systems and methods to perform the topic detection and tracking at a wide range of time resolutions (e.g., from time resolutions on the order of seconds or minutes to time resolutions on the order of hours, days, weeks, months, and years). Furthermore, in some embodiments of the present invention, a user may customize the results and the behavior of the system in accordance with business intelligence and needs.

Tracking Topics

According to one embodiment of the present invention, topics are automatically extracted out of a collection of documents. One way of extracting such topics is described in U.S. patent application Ser. No. 14/327,476 titled "System and Method for Semantically Exploring Concepts" by Faizakof et al. (hereinafter "Faizakof et al."), filed in the United States Patent and Trademark Office on Jul. 9, 2014, the entire disclosure of which is incorporated herein by reference.

Figure 3:
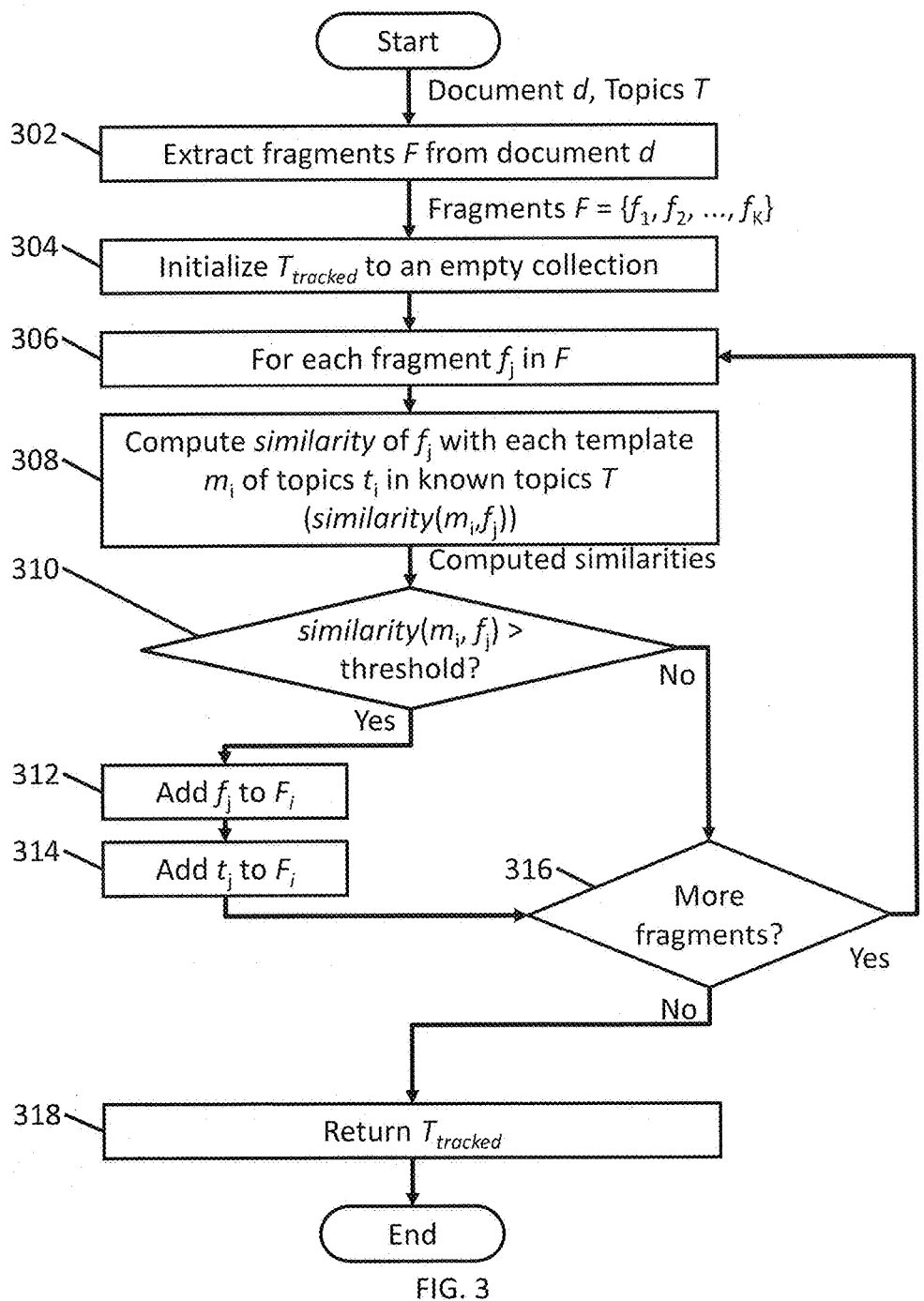
FIG. 3 is a flowchart illustrating a method for tracking the appearance or frequency of previously extracted topics according to one embodiment of the present invention.

FIG. 3 is a flowchart illustrating a method for tracking the appearance or frequency of previously extracted topics according to one embodiment of the present invention. Referring to FIG. 3, according to one embodiment of the present invention, fragments f of a document d are compared with previously extracted topics T. The topics T may include n different topics t (e.g., $T=\{t_1, t_2, \ldots, t_n\}$). Each topic $t_i$ may be represented as a tuple of three elements: a label $l_i$, a template $m_i$, and a collection (e.g., a list) of N fragments $F_i=[f_{i1}, f_{i2}, \ldots, f_{iN}]$ that were assigned to the template $m_i$.

In operation 302, a new document d is received (e.g., a new interaction with a customer is processed) and a topic tracking module 45a extracts K fragments $f_1, f_2, \ldots, f_K$ from the document d. Each of the fragments may include one or more words. Methods for extracting fragments from a document are described, for example, in Faizakof et al.

In operation 304, the topic tracking module 45a initialized an output set of tracked topics $T_{tracked}$ to an empty collection. In operation 306, the topic tracking module 45a identifies a next fragment $f_j$ from the set of extracted fragments $f_1, f_2, \ldots, f_K$ to analyze. In operation 308, the topic tracking module 45a (or a fragment sorting module) computes a similarity between the current fragment $f_i$ with the templates $m_i$ of each topic $t_i$ of the topics T. In one embodiment, in operation 308, if the similarity between a given fragment $f_j$ and a template $m_i$ of topic $t_i$ exceeds a threshold (or a predetermined threshold), then in operation 312 the new fragment $f_j$ is added to the list of fragments $F_i$ of the topic $t_i$ corresponding to the matching template $m_i$, and in operation 314 the matching topic $t_i$ is added to the collection of tracked topics $T_{tracked}$.

The topic tracking module 45a then determines, in operation 315, whether there are more fragments from the set $f_1, f_2, \ldots, f_K$ to analyze. If there are, then the flow returns to operation 306. If not, then the collection of tracked topics $T_{tracked}$ is returned in operation 318.

In other words, the fragments F are filtered to identify fragments with similarity to a template greater than a threshold and the topics corresponding to the matching templates are returned as the set of detected topics.

In another embodiment, the topic tracking module 45a identifies the closest template $m_i$ from among all of the templates of the topics T. If the closest template $m_i$ has a similarity that exceeds a threshold (or a predetermined threshold), then the new fragment $f_j$ is added to the list of fragments $F_i$ of the topic $t_i$ corresponding to the closest matching template $m_i$.

In some embodiments of the present invention, rather than merely processing a single document d, multiple documents D are processed to identify topics that appear within those various documents D. The collection of documents D may include documents received or generated over a particular time period. For example, in the context of a contact center, the documents may be customer interactions that took place during a particular time period.

For example, the time period may be an amount of time up until the present, as measured in some number of years, months, weeks, days, hours, minutes, or seconds or fractions thereof. As another example, the time period may be given as a period with a particular start and end date, where the end date is a time earlier than the present (e.g., from Jan. 1, 2013 until Dec. 31, 2013).

The time periods over which topics are tracked may be set using a user interface 45d and may be automatically generated on a periodic basis. For example, a report of topics detected over the past week may be generated on a weekly basis, an hourly report of tracked topics may be generated every hour (or every 15 minutes), and a near-real time report of topics detected over the past few seconds may be generated every few seconds (or more frequently).

According to one embodiment of the present invention, the topic tracking module 45a computes the similarity between a fragment f having n words w (e.g., $f = \{w_1, w_2, \ldots, w_n\}$) and a template m having n' words (e.g., $m = \{w_1, w_2, \ldots, w_{n'}\}$) by evaluating the following similarity function, as shown in Equation 1, below:

$$\text{similarity}(m, f) = \sqrt{\frac{\sum_{i=1}^{n} IDF(w_i) * I(w_i \in m)}{\sum_{i=1}^{n'} IDF(w_i)}} * \frac{\sum_{i=1}^{n} I(w_i \in m)}{n} \quad \text{Equation 1}$$

where I is an indicator function as shown in Equation 2, below:

$$I(w_i \in m) = \begin{cases} 0 & \text{if } w_i \notin m \\ 1 & \text{if } w_i \in m \end{cases} \quad \text{Equation 2}$$

and where IDF is an inverse document frequency function such as that shown in Equation 3, below:

$$IDF(w) = \log\left(\frac{D}{DF(w)}\right) \quad \text{Equation 3}$$

where D is the total number of documents in the collection and DF(w) is the number of documents in which the word w appears.

The fragment extraction mechanism described in Faizakof et al. works on a single sentence. As such, in some embodiments of the present invention, fragments can be extracted from sentences as they arrive for processing, thereby allowing for rapid detection of topics.

Table 1 below is a pseudocode overview of a method for tracking topics according to one embodiment of the present invention, where $M = \{m | (*, m, *) \in T\}$ (e.g., all of the templates m of all of the topics T).

TABLE 1

TrackTopics(d):
    1. Topics ← Set( )
        1.1. $f_1, \ldots, f_k$ ← ExtractFragments(d)
        1.2. For j ← 1 to k:
            1.2.1. $m_i$ ← arg max$_{m \in M}$ similarity(m, $f_j$)
            1.2.2. If similarity($m_i, f_j$) > threshold similarity($m_j, f_j$) > threshold:
                1.2.2.1. $F_i$.Add($f_j$)
                1.2.2.2. Topics.Add($t_i$)
    2. Return Topics Detecting Topics One aspect of embodiments of the present invention is directed to systems and methods for detecting new topics out of a set of interactions or documents $D = \{d_1, d_2, \ldots, d_n\}$. As before, assuming that the system has already extracted and stored a set of known topics T as a set of topic tuples (e.g., $t_i = (l_i, m_i, F_i)$).

Figure 4:
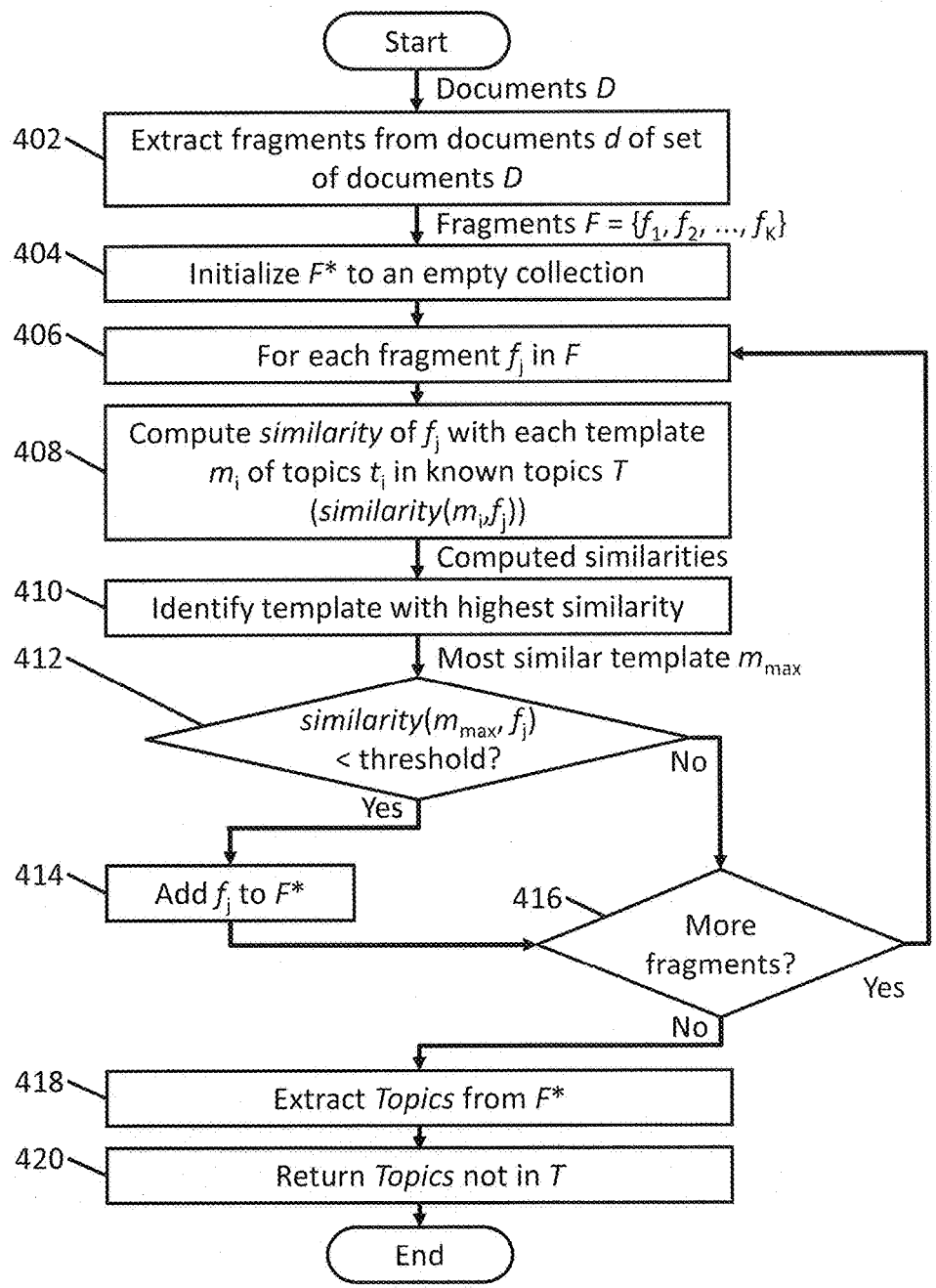
FIG. 4 is a flowchart illustrating a method for detecting topics according to one embodiment of the present invention.

FIG. 4 is a flowchart illustrating a method for detecting topics according to one embodiment of the present invention.

According to one embodiment, in operation 402, the topic detection module 45b (or a fragment extraction module) extracts fragments f from all of the documents d in D to generate a collection of fragments $F = \{f_1, f_2, \ldots, f_K\}$. In operation 404, the topic detection module 45b initializes a set of fragments corresponding to new topics (referred to as F*) as an empty collection. In operation 406, the topic detection module 45b identifies a next fragment $f_j$ of the collection of fragments F to be analyzed. In operation 408, the similarity of the current fragment $f_j$ is compared with the each of the templates $m_i$. In operation 410, the most similar template $m_{max}$ is identified.

In operation 412, the topic detection module 45*b* compares the similarity between the current fragment $f_j$ and the most similar template $m_{max}$ with a threshold value (similarity($m_{max},f_j$). If the similarity is less than that threshold value, then it can be inferred that the current fragment $f_j$ is not similar to any of the existing topics. If this is the case, the topic detection module 45*b* adds the current fragment $f_j$ to the set of fragments corresponding to new topics F* in operation 414.

In operation 416, the topic detection module 45*b* determines whether there are more fragments to process in the set F. If so, then the topic detection module 45*b* selects the next fragment in operation 406. If there are no more fragments to process, then the topic detection module 45*b* extracts a set of Topics from the set of fragments corresponding to new topics F* in operation 418. In one embodiment, the set of Topics is extracted from the fragments in F* using the clustering technique described in Faizakof et al. In operation 420, the set of Topics is returned from this operation after removing the previously detected (or "known") topics T.

The set of previously detected or known topics T may include all topics detected over a particular time period. The time period may be set to any of a variety of time periods spanning, for example, years, months, weeks, days, hours, minutes, and/or seconds, and the set of documents D supplied to the topic detection module correspond to documents collected from a time period different from (e.g., after) the time period of the previously detected topics T.

Table 2 below is a pseudocode overview of a method for detecting topics according to one embodiment of the present invention, where M={m|(*,m,*) ∈ T} (e.g., all of the templates m of all of the previously detected topics T), F is a list of all fragments in D, new topics F* is initialized to an empty list (e.g., List( )), and is filled by all the fragments for which a matching topic is not found among the topics T.

TABLE 2

DetectTopics(D):
   1. F ← ExtractFragments(D)
   2. F* ← List( )
   3. For each $f_j$ in F:
      3.1. v ← max$_{m \in M}$ similarity(m, $f_j$) max$_{m \in M}$ similarty(m, f)
      3.2. If v < threshold:
         3.2.1. F*.Add(f)
   4. Topics ← ExtractTopics(F*)
   5. Return Topics\T Detecting Events One aspect of embodiments of the present invention is directed to systems and methods for detecting events within sentences in documents. The method of detecting new topics as described above is applied to a set of documents and uses a large number of fragments. A similar technique can be applied to a single sentence to detect an event from that sentence. This can be accomplished by applying the same technique as discussed above, but extracting noun phrases (instead of topics) out of the extracted fragments. By applying the technique to a single sentence rather than a large collection of documents, the technique can be applied more rapidly, e.g., in real time or nearly real time. In addition, in some embodiments of the present invention, unimportant or uninteresting events can be eliminated or suppressed by applying statistical methods such as setting a threshold on the number of occurrences of the event or setting a threshold on the calculated TF-IDF value.

Figure 5:
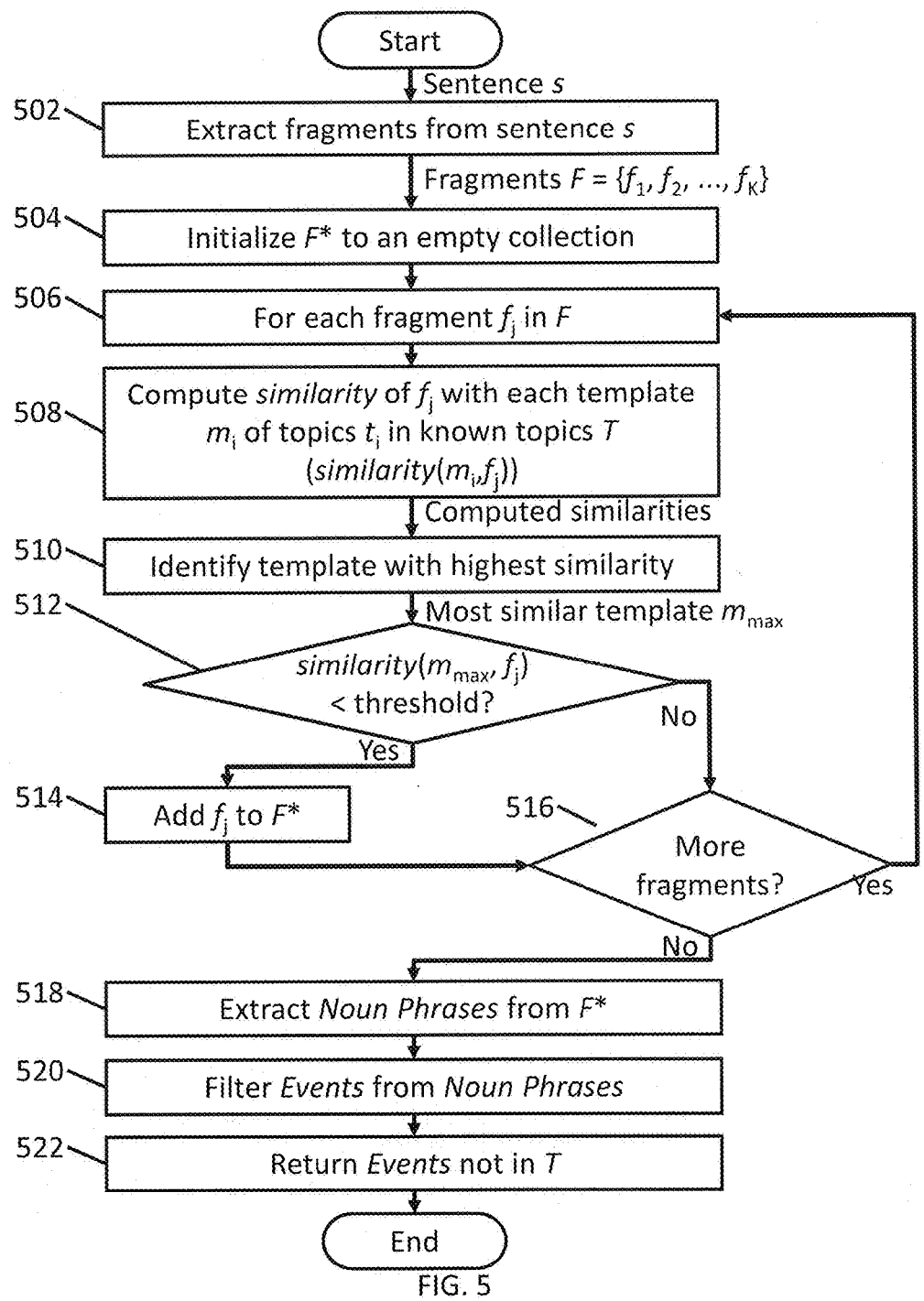
FIG. 5 is a flowchart illustrating a method for detecting events within a sentence according to one embodiment of the present invention.

FIG. 5 is a flowchart illustrating a method for detecting events within a sentence according to one embodiment of the present invention. Referring to FIG. 5, in operation 502, an event detection module 45*c* (or a fragment extraction module) extracts fragments from a given sentence s to generate fragments F of that sentence, where F={$f_1$, $f_2$, ..., $f_K$}. In operation 504, the event detection module 45*c* initializes a collection of fragments F* corresponding to a new event to an empty collection (e.g., an empty list). In operation 506, the event detection module 45*c* selects a fragment $f_j$ from the collection of fragments F and in operation 508, in manner substantially similar to that described above with respect to operation 408 as shown in FIG. 4, it computes the similarity of the current fragment $f_j$ to each template of each of the existing topics T (e.g., topics detected up until the analysis of the current sentence s). In operation 510, in manner substantially similar to that described above with respect to operation 410 as shown in FIG. 4, the event detection module 45*c* identifies the template with the highest similarity, $m_{max}$. In operation 512, the event detection module 45*c* compares the similarity between the most similar fragment $m_{max}$ and the current fragment $f_j$ to a threshold value and, if it is less that threshold value, then the event detection module 45*c* has detected a new event not corresponding to any previously seen topic. As such, the fragment $f_j$ is added to F* in operation 514. The event detection module 45*c* proceeds in operation 516 with determining whether there are any more fragments to process. If there are, then the flow proceeds with selecting the next fragment in operation 506. If not, then a set of noun phrases is extracted from F* in operation 518 using, for example, techniques described in Faizakof et al. In operation 520, the event detection module 45*c* filters a set of events from the extracted noun phrases and in operation 522, the event detection module returns only the events that are not already in topics T, so that new events, not previously detected topics, are returned.

Table 3 below is a pseudocode overview of a method for detecting events according to one embodiment of the present invention, where s is a sentence (e.g., a portion of a document), M={m|(*,m,*) ∈ T} (e.g., all of the templates m of all of the topics T), F is a collection of all fragments in D, new topics F* is initialized to an empty list (e.g., List( )), and is filled by all the fragments for which a matching topic is not found among the topics T.

TABLE 3

DetectEvents(s):
   6. F ← ExtractFragments(s)
   7. F* ← List( )
   8. For each f in F:
      8.1. v ← max$_{m \in M}$ similarty(m,f)
      8.2. If v < threshold:
         8.2.1. F*.Add(f)
   9. Events ← ExtractNPs(F*)
   10. Events ← FilterEvents(Events)
   11. Return Events\T In one embodiment, the Events are extracted as noun phrases of the fragments (e.g., in ExtractNP(F*) above). In other embodiments, the Events are extracted as one or more of the original fragments F.

Explicit User Interaction

Figure 6A:
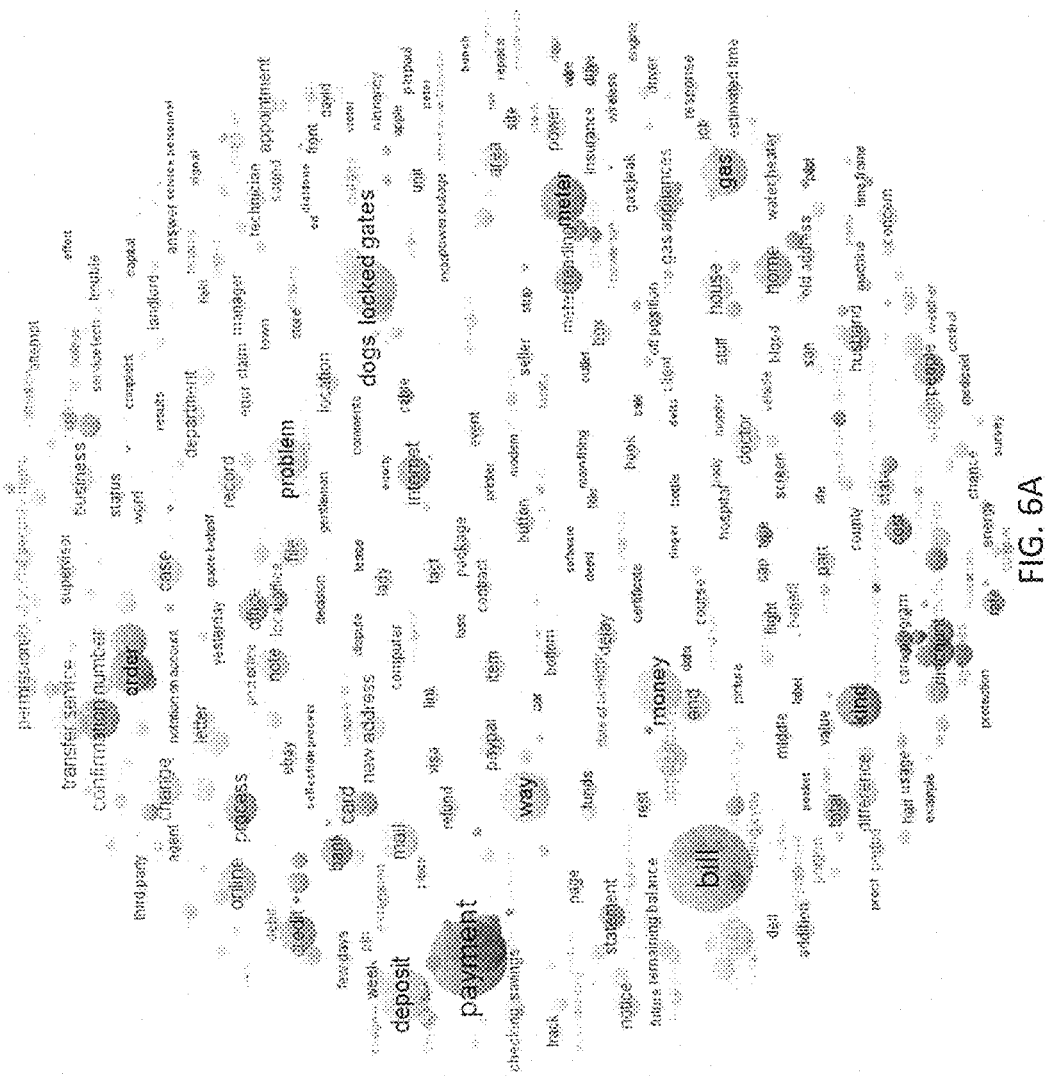
FIGS. 6A, 6B, and 6C illustrate visualizations of topics detected over a specific domain according to one embodiment of the present invention.
Figures 6B, 6C:

One aspect of embodiments of the present invention is directed to visualizing the various topics extracted over time from the processed documents and providing functionality for a user to tailor the visualization to his or her needs. For example, FIGS. 6A, 6B, and 6C illustrate topics detected over a specific domain, where the relative sizes of the circles represent the relative frequencies with which the detected topics (e.g., "bill," "payment," and "locked gates") appear in the collection of documents according to one embodiment of the present invention, where FIGS. 6B and 6C represent, for example, "zoomed in" views of a portion of FIG. 6A, illustrating topics related to "payment" and "access," respectively. Aspects of embodiments of the present invention are directed to systems and methods for adjusting various parameters of the topic tracking and detecting techniques described above such that, over time, topics that the user finds uninteresting (or unimportant) are reduced or removed (or hidden) and topics that the user finds interesting (or important) will be shown when they actually appear in the documents.

Assuming, as before, that a system according to an embodiment of the present invention has detected a set of topics T as topic tuples, given a set of documents in a particular time frame, the system can generate a set of old topics $T_{old}$, where $T_{old}$ represents a set of topics detected before a particular time within the time frame (where $T_{old} \subseteq T$) and a set of new topics $T_{new}$ (where $T_{new} \cap T_{old} = \emptyset$ or $T_{new} = T \setminus T_{old}$).

Various embodiments of the present invention provide a user with the ability to modify the tracking and visualization of topics in one or more of the following ways:

A "stop tracking a topic" function allows the user to stop tracking a specific topic that the system has generated.

A "start tracking a topic" function allows the user to start tracking a new topic. This topic can be one of the topics generated by the system or one suggested by the user.

An "edit a topic" function allows the user to change the label of and remove fragments from a topic.

A "change a topic color" function allows the user to change the color of a topic in the visualization (e.g., change the color of the cluster).

A "show manual changes" function allows the user to see the previous actions taken.

An "undo" function allows a user to undo previously made changes.

Requests to execute the above functions may be provided to embodiments of the present invention via the user interface 45d.

Figure 6D:
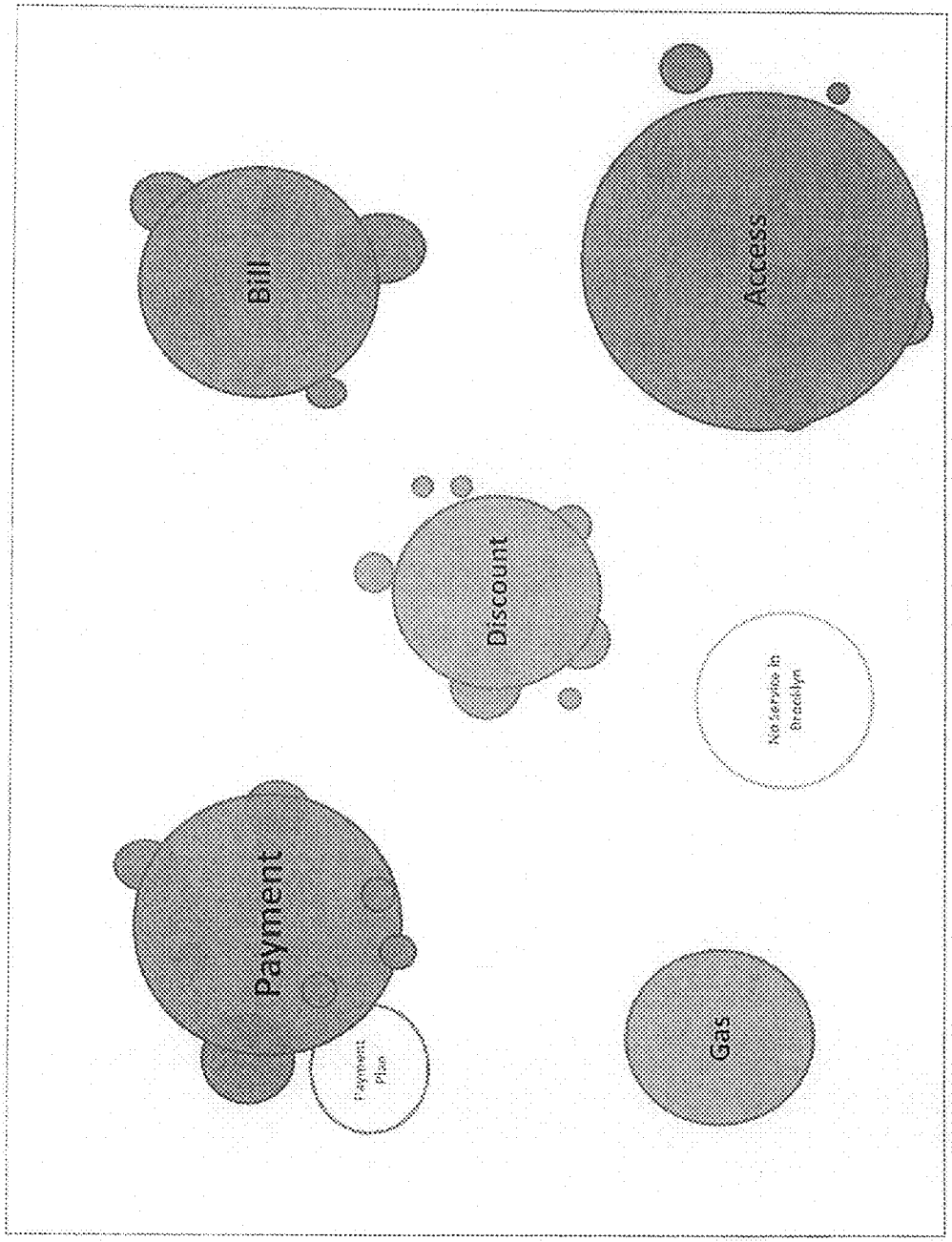
FIG. 6D illustrates a user interface displaying a visualization, prior to a user's making changes to the visualization, according to one embodiment of the present invention.
Figure 6E:
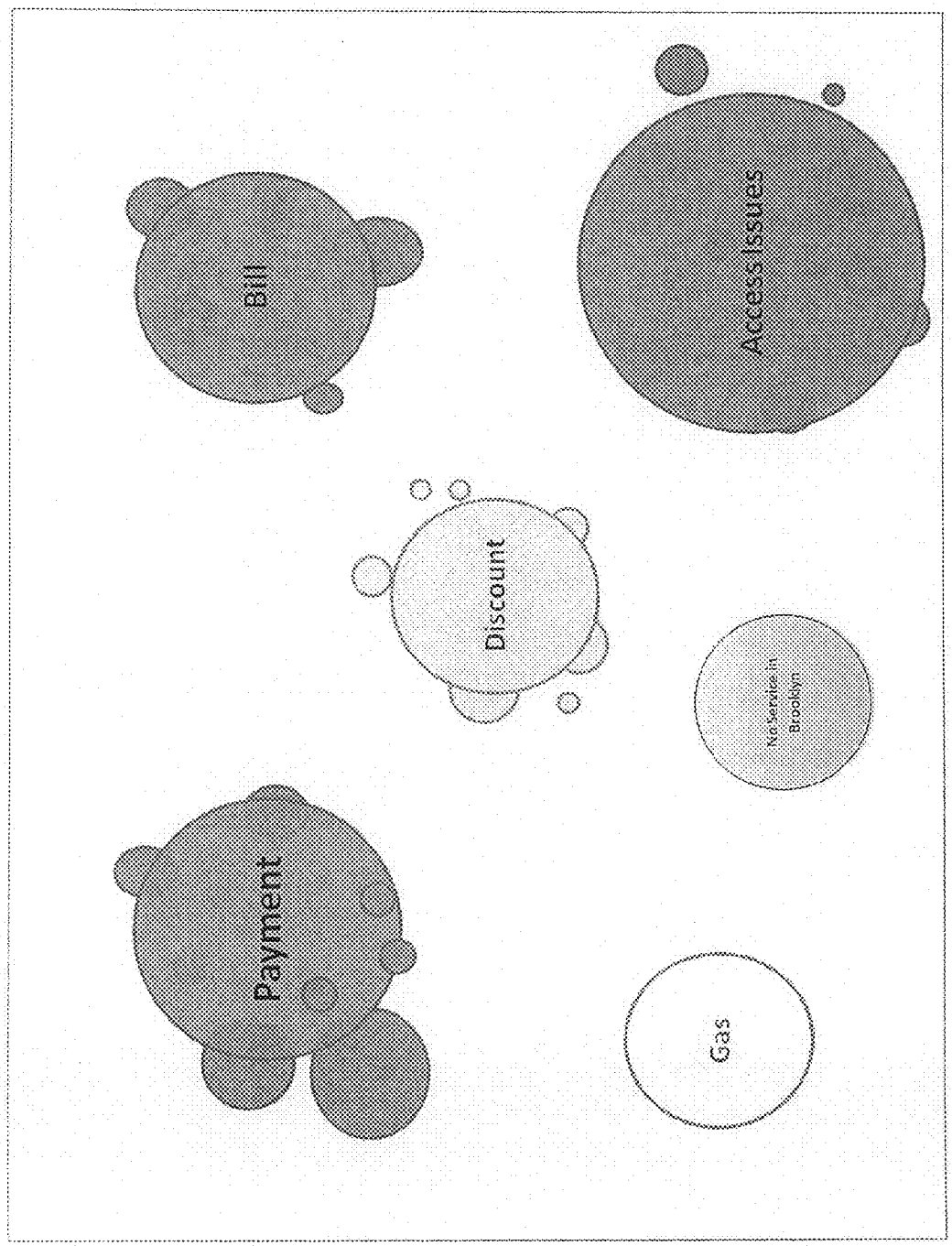
FIG. 6E illustrates a user interface displaying a modified visualization, after applying a user's changes, according to one embodiment of the present invention.

FIG. 6D illustrates a user interface displaying a visualization according to one embodiment of the present invention prior to a user's making changes to the visualization and FIG. 6E illustrates a modified visualization after applying a user's changes according to one embodiment of the present invention.

Embodiments of the present invention may receive, from the user interface 45d, a user input specifying one or more periods of time for which the visualizations (e.g., FIGS. 6A, 6B, 6C, 6D, and 6E are generated. For example, a user may want to visualize the events detected over the past week and request new events detected during that time period. As another example, a user may want to view trends in tracked topics over the course of a month and generate a graph showing the top topics for each day of that month. Another embodiment of the present invention is configured to generate an animation where each "frame" of the animation shows circles (e.g., as shown in FIGS. 6A, 6B, 6C, 6D, and 6E) illustrating the relative numbers of documents relating to a topic during a given hour. By showing each of these frames in sequence, trends in topics can be viewed over time as circles that may appear, grow, shrink, and disappear over time. In some embodiments of the present invention, the user interface 45d provides a user with the ability to smoothly control the speed of the animation or scrub through the animation to focus on time periods of particular interest.

Figure 7:
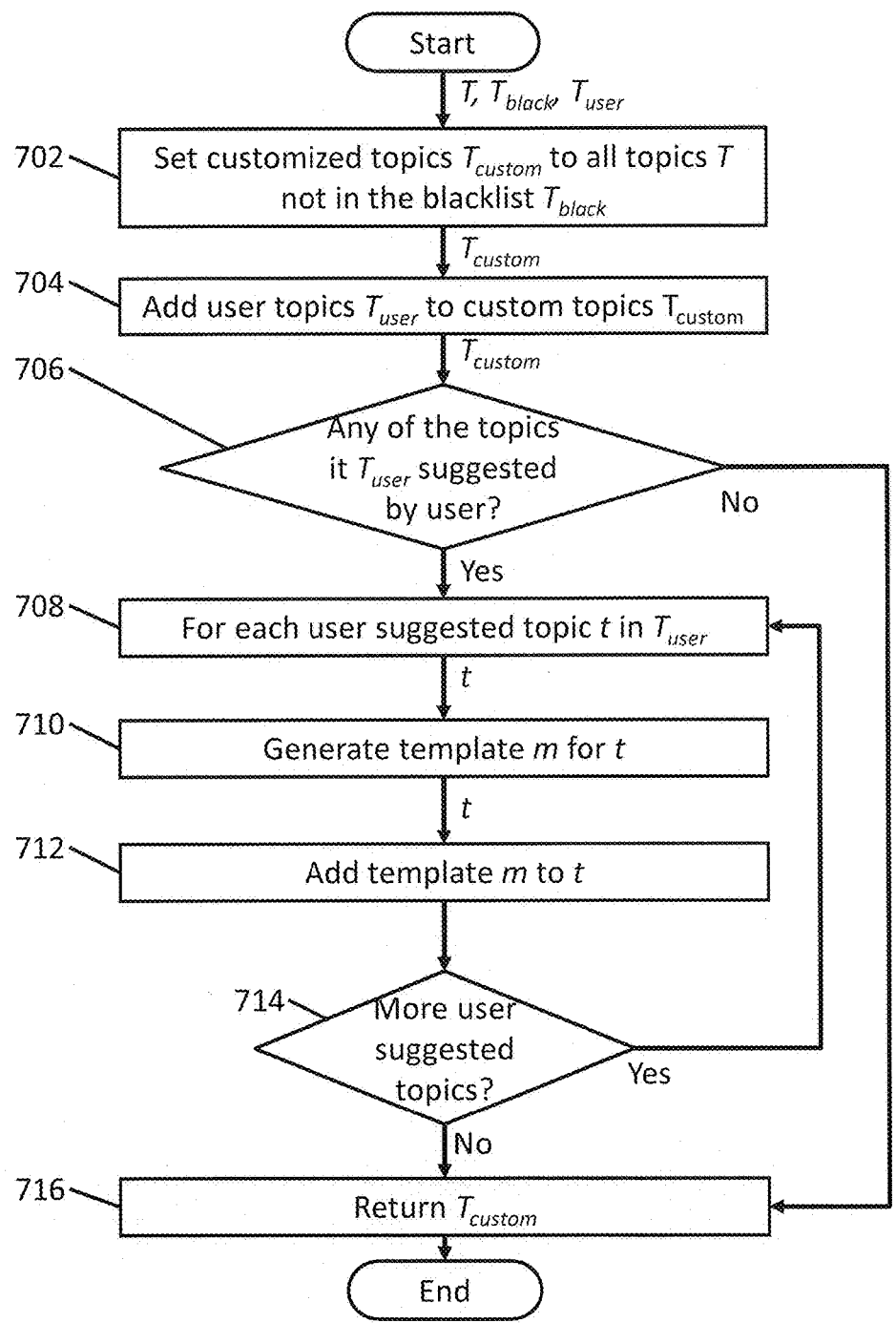
FIG. 7 is a flowchart illustrating a method for customizing of methods of topic detection and tracking according to one embodiment of the present invention.

FIG. 7 is a flowchart illustrating a method for customizing of methods of topic detection and tracking according to one embodiment of the present invention. Referring to FIG. 7, a topic customization module 45d receives, from the user interface module 45e, a set of blacklisted topics $T_{black}$ for topics that a user wants to stop tracking. In operation 702, the visualization configuration module sets the customized set of topics to be tracked $T_{custom}$ to include the topics in T that are not in the set of blacklisted topics $T_{black}$ (e.g., $T_{custom} = T \setminus T_{black}$). In operation 704, the parameter modification module 45d adds topics $T_{user}$ that the user wants to start tracking to the customized set of topics (e.g., $T_{custom} = T_{custom} \cup T_{user}$). In operation 706, the set of user topics $T_{user}$ is evaluated to determine if any of the topics were suggested by the user rather than generated by the system. If not, then the customized set of topics $T_{custom}$ is returned in operation 716. If any of those user topics $T_{user}$ were suggested by the user, then the topic customization module 45d converts each of the user suggested topics into a topic tuple.

In some circumstances, each of the user generated topics t includes a label l but not a template m. As such, in operation 708, for each user suggested topic t in $T_{user}$, the topic customization module 45d automatically generates a template m corresponding to the topic t out of previous documents D or may use the provided label l of the topic itself as the template.

When automatically generating a template after a user generates a topic, e.g., by providing a list of phrases or words, there are two possibilities: the topic already exists in the system, therefore it already has a template (and this is the template used for the topic), or it does not, (it is a new topic). If it is a new topic, then, in one embodiment, working only on the user provided phrases when defining the topic, and this set of user defined phrases can be analyzed as a set of documents and the medoid (e.g., the phrase for which the total of the similarities between the phrase and every other user supplied phrase is minimized). In another embodiment, the topic is added to the set of fragment extraction rules so that fragments that contain this topic are extracted from previous documents, and the medoid of these fragments is selected as the template.

Figure 8:
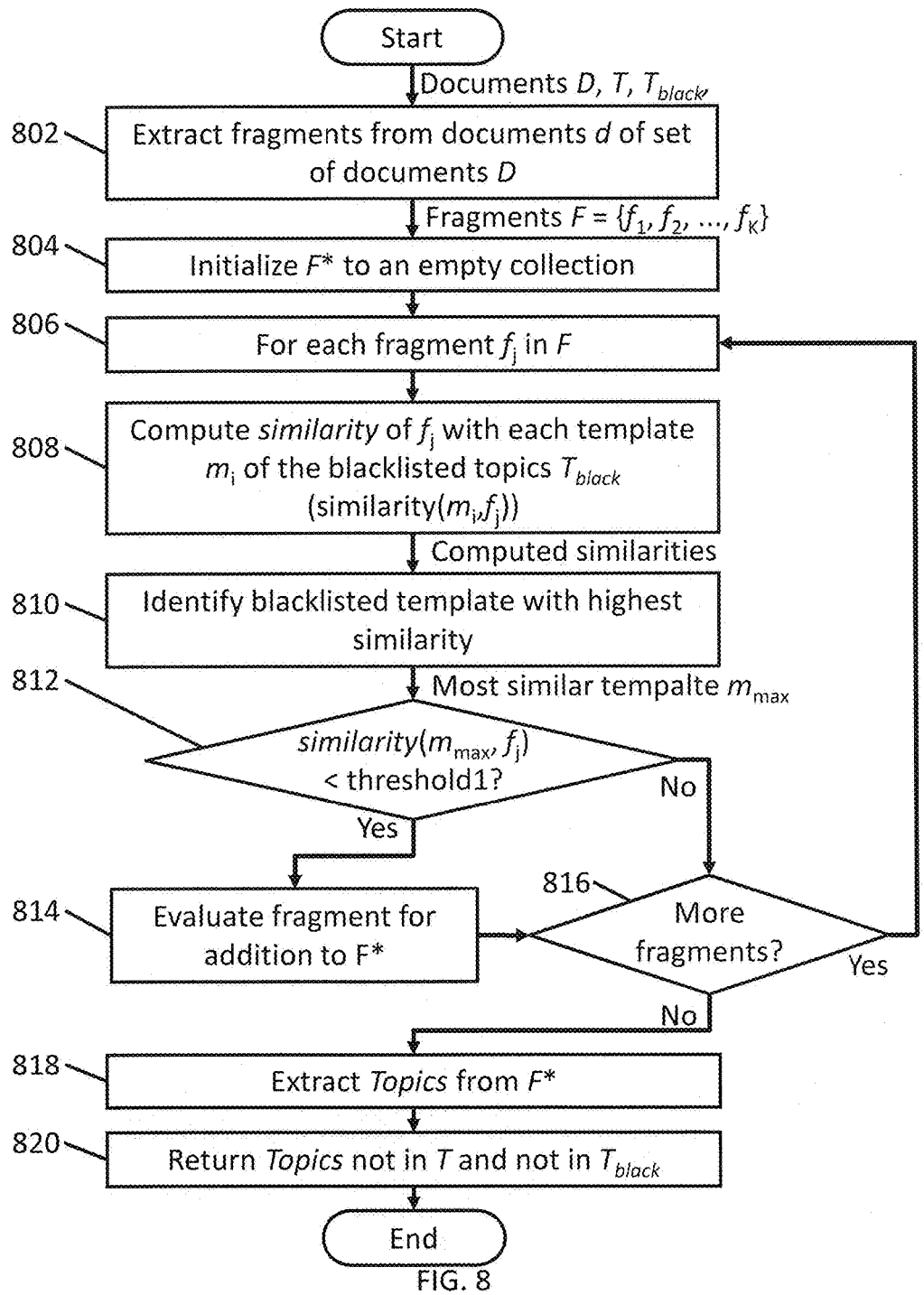
FIG. 8 is a flowchart illustrating a method of detecting topics in the customized set of topics according to one embodiment of the present invention.

The customized set of topics $T_{custom}$ are supplied to the topic detection module 45b along with the blacklisted topics $T_{black}$. FIG. 8 is a flowchart illustrating a method of detecting topics in the customized set of topics according to one embodiment of the present invention. The operations in FIG. 8 that are substantially similar to those in FIG. 4 will not be described again in detail herein. In operation 808, the topic detection module 45b computes similarity of the fragments to templates in the blacklisted topics $T_{black}$. If the similarity of the fragment f to the most similar template $m_{max}$ is greater than a first threshold ("threshold1" or "blacklist threshold"), then the fragment is ignored and the topic detection module 45b checks to see if there are more fragments in operation 816. Otherwise, the fragment f is evaluated for addition to new topics F* in operation 814, as described in more detail with respect to FIG. 9, below, so that the fragment is evaluated for addition to new topics F* only when its similarity to a blacklisted topic does not exceed the blacklist threshold. After all of the fragments in F are processed, in operation 818 the topic detection module 45b (or a topic extraction module) extracts Topics from the set of new topics F* and, in operation 820, the topic detection module 45b (or the topic extraction module) returns the set of detected new topics, e.g., the extracted Topics excluding the old topics T and the blacklisted topics $T_{black}$ (e.g., Topics\ (T∪$T_{black}$)).

Alternatively, the above operations can be equivalently considered as removing fragments that have a similarity to blacklisted topics exceeding the blacklist threshold, and then evaluating the remaining fragments to detect new topics.

Figure 9:
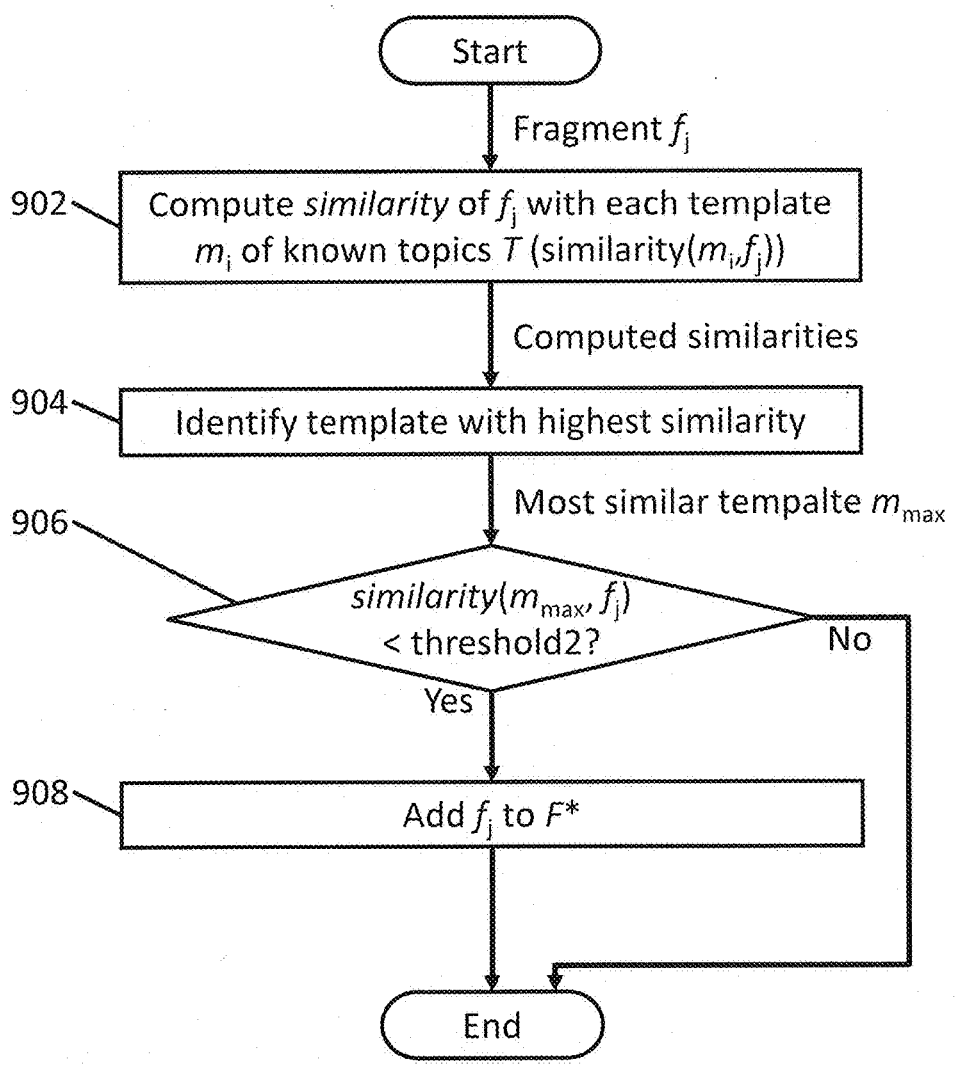
FIG. 9 is a flowchart illustrating a method for evaluating a fragment for addition to the set of new topics according to one embodiment of the present invention.

FIG. 9 is a flowchart illustrating a method 814 for evaluating a fragment $f_j$ for addition to the set of new topics F* according to one embodiment of the present invention. The topic detection module 45b begins the fragment evaluation operation 814 by computing, in operation 902, a similarity between a fragment $f_j$ and each of the templates of the customized set of topics $T_{custom}$ (e.g., all of the detected topics T, without the blacklisted topics $T_{black}$ and with the user defined topics $T_{user}$). Based on the computed similarities, in operation 904, in a manner similar to that described above, the template having highest similarity $m_{max}$ is identified. In operation 906, the similarity is compared to a second threshold ("threshold2"). If the similarity between $m_{max}$ and f exceeds the second threshold ("threshold2"), then the topic detection module 45b adds the fragment to the set of new topics F* in operation 908. Otherwise, to the closest matching topic, if the similarity exceeds a threshold.

Table 4 below is a pseudocode overview of a method for detecting topics according to one embodiment of the present invention, where M={m|(*,m,*) ∈ T} (e.g., all of the templates m of all of the topics T), $M_{black}$={m|(*,m,*) ∈ $T_{black}$} (e.g., all of the templates m of the blacklisted topics $T_{black}$), F is a list of all fragments in D, F* is initialized to an empty list (e.g., List( )), and is filled by all the fragments for which a matching topic is not found among the topics T.

TABLE 4

InteractiveDetectTopics(D):
1. F ← ExtractFragments(D)
2. F* ← List( )
3. For each $f_j$ in F:
   3.1. u ← $\max_{m \in M_{black}}$ similarity(m, $f_j$) $\max_{m \in M_{black}}$ similarty (m, f)
   3.2. If u < threshold1:
      3.2.1. v ← $\max_{m \in M}$ similarity(m, $f_j$)
      3.2.2. If v < threshold2:
         3.2.2.1. F*.Add(f)
4. Topics ← ExtractTopics(F*)
5. Return Topics \ (T ∪ $T_{black}$)

In some embodiments of the present invention, the user interface module 45e is configured to receive a user request to change the label of a topic $t_i$ to new label $l_{new}$. In such a case, the system is configured to change the corresponding topic tuple $t_i$: ($l_i$, $m_i$, $F_i$) is changed to $t_i$: ($l_{new}$, $m_i$, $F_i$).

In some embodiments of the present invention, the user interface module 45e is configured to receive a user request to remove a fragment $f_j$ from topic $t_i$. In such a case, the set of fragments $F_i$ corresponding to the topic $t_i$ is identified and the specified fragment $f_j$ is removed from $F_i$. If the specified fragment $f_j$ was the topic's template $m_i$, then, in one embodiment, the topic detection module 45b identifies a new template $m_i$ for topic $t_i$ from the remaining fragments in $F_i$.

In one embodiment of the present invention, identifying such a replacement topic template $m_i$ from among the fragments $F_i$ requires O($n^2$) time (where n represents the number of fragments in $F_i$) because each fragment in $F_i$ will be compared with every other fragment in $F_i$.

According to another embodiment of the present invention, identifying a replacement topic $m_i$ from among the fragments $F_i$ is performed in O(n) time by previously storing the sum of similarities of each fragment to all of the other fragments and then updating the stored sums by subtracting the similarity to removed fragment $f_j$ from the stored sums of similarities.

Implicit User Interaction

In another embodiment of the present invention, a topic inference module 45f automatically or semi-automatically infers the user's preferences for interesting topics based on a user's search queries. Those queries are textual searches executed on the text index used to store the documents (interactions).

In one embodiment, the similarity function between a template and a search query can be computed based on the Levenshtein distance between the search phrase and the label of the topic or one of its fragments. In another embodiment, the similarity function can be the same similarity function described above and used as one way to compare fragments f to templates m.

In one embodiment of aspects of the present invention, the textual searches include Boolean logic operators such as AND, OR, and NOT. For example, a search query may read: "I want to cancel my account" OR "Please close my account" OR "I want to disconnect".

When a user searches for a group of phrases together, they are usually related and may refer to a common topic. As such, the topic inference module 45f according embodiments of the present invention may use this information to group fragments together into one topic (an existing topic or a new topic) or merge two topics into one topic. In the above example, the topic inference module could consider, for example, a topic A from a particular time period as a tracked copy of a topic B from an earlier time period.

For example, the phrases "need to speak with the person being added" "person added needs to call back" and "person being added will need to call back" searched for together could suggest to the topic inference module 45f that the user is looking for a new topic of "speaking with the newly added person".

As another example, searching for the phrases: "not the customer of record", "name not on the account", "cannot release information", "need to speak with main customer of record", "can only speak to customer of record", "you're not listed on the account", "not the customer on the account" would suggest to the topic inference module 45f that the user is looking for a topic of "a mismatch between an account and a caller".

The new topics (or the templates corresponding to the topics) corresponding to the supplied phrases can be computed in a manner similar to that described above with respect to automatically generating a new topic based on a set of phrases supplied by a user. For example, in one embodiment, the medioid of supplied phrases is set as the template for the new topic.

Embodiments of the invention can be practiced as methods or systems. Computer devices or systems including, for example, a microprocessor, memory, a network communications device, and a mass storage device can be used to execute the processes described above in an automated or semi-automated fashion. In other words, the above processes can be coded as computer executable code and processed by the computer device or system.

It should also be appreciated from the above that various structures and functions described herein may be incorporated into a variety of apparatus. In some embodiments, hardware components such as processors, controllers, and/or logic may be used to implement the described components or circuits. In some embodiments, code such as software or firmware executing on one or more processing devices may be used to implement one or more of the described operations or components.

As would be understood by one of ordinary skill in the art, the processes described herein and as illustrated in the flowcharts in the figures may be implemented by instructions stored in computer memory to control a computer processor to perform the described functions. In addition, steps and operations shown in the flowchart do not need to be executed in the order shown and person of ordinary skill in the art at the time the invention was made the order of the steps and operations performed may vary without deviating from or substantially altering the underlying technique.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A method for tracking known topics in a plurality of interactions, the method comprising:
   extracting, by a processor, a plurality of fragments from the plurality of interactions, the plurality of interactions occurring over a particular time period, each fragment of the plurality of fragments comprising one or more words;
   initializing, by the processor, a collection of tracked topics to an empty collection;
   computing, by the processor, a similarity between each fragment of the fragments and each of the known topics, each of the known topics comprising a template fragment comprising one or more template words, the similarity between a fragment of the fragments and a topic of the known topics being computed based on the one or more words of the fragment and the one or more template words of the template fragment of the topic;
   adding, by the processor, a known topic of the known topics to the tracked topics in response to the similarity between a fragment and the known topic exceeding a threshold value; and
   returning, by the processor, a collection of the tracked topics detected in the plurality of interactions, the collection comprising indications of frequencies at which the tracked topics occur in the plurality of interactions during the particular time period.

2. The method of claim 1, wherein the known topics correspond to a first time period, and
   wherein the interactions correspond to a second time period comprising the particular time period, the second time period being different from the first time period.

3. The method of claim 2, further comprising:
   receiving a time point from a user interface,
   wherein the first time period is before the time point, and
   wherein the second time period is after the time point.

4. The method of claim 1, wherein the plurality of interactions correspond to a first time period comprising the particular time period, and
   wherein the method further comprises:
   extracting, by a processor, a second plurality of fragments from a second plurality of interactions, the second plurality of interactions corresponding to a second time period, the second time period being different from the first time period;
   initializing, by the processor, a second collection of tracked topics to the empty collection;
   computing, by the processor, a similarity between each fragment of the second fragments and each of the known topics; and
   adding, by the processor, a known topic of the known topics to the second tracked topics in response to the similarity between a fragment and the known topic exceeding the threshold value.

5. The method of claim 4, wherein the first time period has a length different from a length of the second time period.

6. The method of claim 4, wherein the first time period has a start time different from a start time of the second time period.

7. The method of claim 1, further comprising:
   generating, by the processor, a visualization of the tracked topics.

8. The method of claim 7, further comprising receiving, by the processor, a request to edit a topic of the tracked topics, the request comprising one or more of:
   a request to change a color of the topic in the visualization;
   a request to change a label of the topic; and
   a request to remove fragments from the topic.

9. The method of claim 1, further comprising:
   receiving, by the processor, a user request to combine two topics of the tracked topics; and
   merging, by the processor, the two topics of the tracked topics.

10. A method for detecting new topics in a plurality of interactions, given a plurality of known topics, the method comprising:
    extracting, by a processor, a plurality of fragments from the plurality of interactions, the plurality of interactions occurring over a particular time period, each fragment of the plurality of fragments comprising one or more words;
    initializing, by the processor, a collection of detected new fragments to an empty collection;
    computing, by the processor, a similarity between each fragment and each of the known topics, each of the known topics comprising a template fragment comprising one or more template words, the similarity between a fragment of the fragments and a topic of the known topics being computed based on the one or more words of the fragment and the one or more template words of the template fragment of the topic;
    identifying, by the processor, for each fragment, a corresponding topic having a highest similarity;
    adding, by the processor, a fragment of the fragments to the collection of detected new fragments in response to the similarity between the fragment and the corresponding topic having the highest similarity is less than a threshold value;
    extracting, by the processor, one or more new topics from the collection of detected new fragments; and
    returning, by the processor, a collection of the one or more new topics detected in the plurality of interactions, the collection comprising indications of frequencies at which the one or more new topics occur in the plurality of interactions during the particular time period.

11. The method of claim 10, further comprising:
receiving, by the processor, a request to stop tracking a blacklisted topic;
adding, by the processor, the blacklisted topic to a collection of blacklisted topics; and
computing, by the processor, a similarity between each fragment and each of the blacklisted topics,
wherein the computing, by the processor, the similarity between each fragment and each of the known topics is only performed in response to the similarity of the fragment to any blacklisted topic being less than a blacklist threshold value.

12. The method of claim 10, further comprising:
receiving, by the processor, a request to start tracking a user topic;
adding, by the processor, the user topic to a collection of user topics;
determining, by the processor, whether one or more of the user topics are user suggested topics;
generating, by the processor, a topic for each of the user suggested topics; and
adding the collection of user topics to the plurality of known topics.

13. The method of claim 10, further comprising:
receiving, by the processor, a plurality of blacklisted topics; and
removing, by the processor, all of the blacklisted topics from the one or more new topics.

14. A method for detecting one or more events in a portion of an interaction, given a plurality of known topics, the method comprising:
extracting, by a processor, a plurality of fragments from the portion of the interaction, each fragment of the plurality of fragments comprising one or more words;
initializing, by the processor, a collection of detected new fragments to an empty collection;
computing, by the processor, a similarity between each fragment and each of the known topics, each of the known topics comprising a template fragment comprising one or more template words, the similarity between a fragment of the fragments and a topic of the known topics being computed based on the one or more words of the fragment and the one or more template words of the template fragment of the topic;
identifying, by the processor, for each fragment, a corresponding topic having a highest similarity;
adding, by the processor, a fragment of the fragments to the collection of detected new fragments in response to the similarity between the fragment and the corresponding topic having the highest similarity being greater than a threshold value;
extracting, by the processor, one or more noun phrases from the collection of detected new fragments;
filtering, by the processor, one or more events from the one or more noun phrases; and
returning, by the processor, a collection of the one or more events detected in the portion of the interaction.

15. The method of claim 14, further comprising:
receiving, by the processor, a plurality of blacklisted topics; and
removing, by the processor, all of the blacklisted topics from the one or more events.

16. A method for automatically generating a new topic based on a search query, the method comprising:
receiving, by a processor, the search query;
determining, by the processor, a plurality of fragments corresponding to the search query, each fragment of the plurality of fragments comprising one or more words;
identifying, by the processor, a template fragment of the plurality of fragments, the template fragment comprising one or more template words, each of the fragments having a similarity to the template fragment exceeding a threshold, each similarity between a fragment of the fragments and the template fragment being computed based on the one or more words of the fragment and the one or more template words of the template fragment; and
generating, by the processor, the new topic in accordance with the template fragment and the fragments.

17. A system for tracking known topics in a plurality of interactions, the system comprising:
a processor; and
memory, wherein the memory has stored thereon instructions that, when executed by the processor, cause the processor to:
extract a plurality of fragments from the plurality of interactions, the plurality of interactions occurring over a particular time period, each fragment of the plurality of fragments comprising one or more words;
initialize a collection of tracked topics to an empty collection;
compute a similarity between each fragment of the fragments and each of the known topics, each of the known topics comprising a template fragment comprising one or more template words, the similarity between a fragment of the fragments and a topic of the known topics being computed based on the one or more words of the fragment and the one or more template words of the template fragment of the topic;
add a known topic of the known topics to the tracked topics in response to the similarity between a fragment and the known topic exceeding a threshold value; and
return a collection of the tracked topics detected in the plurality of interactions, the collection comprising indications of frequencies at which the tracked topics occur in the plurality of interactions during the particular time period.

18. The system of claim 17, wherein the known topics correspond to a first time period, and
wherein the interactions correspond to a second time period, the second time period being different from the first time period.

19. The system of claim 18, wherein the memory further stores instructions that, when executed by the processor, cause the processor to:
receive a time point from a user interface,
wherein the first time period is before the time point, and
wherein the second time period is after the time point.

20. The system of claim 17, wherein the plurality of interactions correspond to a first time period, and
wherein the memory further stores instructions that, when executed by the processor, cause the processor to:
extract a second plurality of fragments from a second plurality of interactions, the second plurality of interactions corresponding to a second time period, the second time period being different from the first time period;
initialize a second collection of tracked topics to the empty collection;

compute a similarity between each fragment of the second fragments and each of the known topics; and add a known topic of the known topics to the second tracked topics in response to the similarity between a fragment and the known topic exceeding the threshold value.

21. The system of claim 20, wherein the first time period has a length different from a length of the second time period.

22. The system of claim 20, wherein the first time period has a start time different from a start time of the second time period.

23. The system of claim 17, wherein the memory further stores instructions that, when executed by the processor, cause the processor to:

generate, by the processor, a visualization of the tracked topics.

24. The system of claim 23, wherein the memory further stores instructions that, when executed by the processor, cause the processor to: receive a request to edit a topic of the tracked topics, the request comprising one or more of:

a request to change a color of the topic in the visualization;

a request to change a label of the topic; and a request to remove fragments from the topic.

25. The system of claim 17, wherein the memory further stores instructions that, when executed by the processor, cause the processor to:

receive a user request to combine two topics of the tracked topics; and merge the two topics of the tracked topics.

26. A system for detecting new topics in a plurality of interactions, given a plurality of known topics, the system comprising:

a processor; and memory, wherein the memory has stored thereon instructions that, when executed by the processor, cause the processor to:

extract a plurality of fragments from the plurality of interactions, the plurality of interactions occurring over a particular time period, each fragment of the plurality of fragments comprising one or more words;

initialize a collection of detected new fragments to an empty collection;

compute a similarity between each fragment and each of the known topics, each of the known topics comprising a template fragment comprising one or more template words, the similarity between a fragment of the fragments and a topic of the known topics being computed based on the one or more words of the fragment and the one or more template words of the template fragment of the topic;

identify, for each fragment, a corresponding topic having a highest similarity;

add a fragment of the fragments to the collection of detected new fragments in response to the similarity between the fragment and the corresponding topic having the highest similarity is less than a threshold value;

extract one or more new topics from the collection of detected new fragments; and return a collection of the one or more new topics detected in the plurality of interactions, the collection comprising indications of frequencies at which the one or more new topics occur in the plurality of interactions during the particular time period.

27. The system of claim 26, wherein the memory further has stored thereon instructions that, when executed by the processor, cause the processor to:

receive a request to stop tracking a blacklisted topic;

add the blacklisted topic to a collection of blacklisted topics; and compute a similarity between each fragment and each of the blacklisted topics, wherein the instructions to compute the similarity between each fragment and each of the known topics are only executed in response to the similarity of the fragment to any blacklisted topic being less than a blacklist threshold value.

28. The system of claim 26, wherein the memory further has stored thereon instructions that, when executed by the processor, cause the processor to:

receive a request to start tracking a user topic;

add the user topic to a collection of user topics;

determine whether one or more of the user topics are user suggested topics;

generate a topic for each of the user suggested topics; and add the collection of user topics to the plurality of known topics.

29. The system of claim 26, wherein the memory further has stored thereon instructions that, when executed by the processor, cause the processor to:

receive a plurality of blacklisted topics; and remove all of the blacklisted topics from the one or more new topics.

30. A system for detecting one or more events in a portion of an interaction, given a plurality of known topics, the system comprising:

a processor; and memory, wherein the memory has stored thereon instructions that, when executed by the processor, cause the processor to:

extract a plurality of fragments from the portion of the interaction, each fragment of the plurality of fragments comprising one or more words;

initialize a collection of detected new fragments to an empty collection;

compute a similarity between each fragment and each of the known topics, each of the known topics comprising a template fragment comprising one or more template words, the similarity between a fragment of the fragments and a topic of the known topics being computed based on the one or more words of the fragment and the one or more template words of the template fragment of the topic;

identify, for each fragment, a corresponding topic having a highest similarity;

add a fragment of the fragments to the collection of detected new fragments in response to the similarity between the fragment and the corresponding topic having the highest similarity being greater than a threshold value;

extract one or more noun phrases from the collection of detected new fragments;

filter one or more events from the one or more noun phrases; and return a collection of the one or more events detected in the portion of the interaction.

31. The system of claim 30, wherein the memory further has stored thereon instructions that, when executed by the processor, cause the processor to:

receive a plurality of blacklisted topics; and remove all of the blacklisted topics from the one or more events.

32. A system for automatically generating a new topic based on a search query, the system comprising:

a processor; and memory, wherein the memory has stored thereon instructions that, when executed by the processor, cause the processor to:

receive the search query;

determine a plurality of fragments corresponding to the search query, each fragment of the plurality of fragments comprising one or more words;

identify a template fragment of the plurality of fragments, the template fragment comprising one or more template words, each of the fragments having a similarity to the template fragment exceeding a threshold, each similarity between a fragment of the fragments and the template fragment being computed based on the one or more words of the fragment and the one or more template words of the template fragment; and generate the new topic in accordance with the template fragment and the fragments.

\* \* \* \* \*